United States Patent
Gudivada et al.

(10) Patent No.: US 11,887,397 B2
(45) Date of Patent: Jan. 30, 2024

(54) ULTRASONIC FINGERPRINT SENSOR TECHNOLOGIES AND METHODS FOR MULTI-SURFACE DISPLAYS

(71) Applicant: QUALCOMM Incorporated, San Diego, CA (US)

(72) Inventors: Naga Chandan Babu Gudivada, Hyderabad (IN); Prakash Tiwari, Hyderabad (IN); Rakesh Pallerla, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 50 days.

(21) Appl. No.: 17/443,938

(22) Filed: Jul. 28, 2021

(65) Prior Publication Data

US 2023/0034956 A1   Feb. 2, 2023

(51) Int. Cl.
*G06V 40/13* (2022.01)
*G06V 40/12* (2022.01)
*G06F 3/043* (2006.01)
*G06F 21/32* (2013.01)

(52) U.S. Cl.
CPC .......... *G06V 40/1306* (2022.01); *G06F 3/043* (2013.01); *G06F 21/32* (2013.01); *G06V 40/1365* (2022.01)

(58) Field of Classification Search
CPC . G06V 40/1306; G06V 40/1365; G06F 21/32
See application file for complete search history.

(56) References Cited

U.S. PATENT DOCUMENTS

| | | | |
|---|---|---|---|
| 2011/0254762 A1* | 10/2011 | Dahl | G06F 3/043 341/20 |
| 2016/0026381 A1 | 1/2016 | Kim et al. | |
| 2017/0017388 A1* | 1/2017 | Heo | G06F 3/0346 |
| 2018/0143669 A1* | 5/2018 | Bok | G06F 1/1637 |
| 2021/0216734 A1* | 7/2021 | Liu | G06V 40/1376 |
| 2021/0373739 A1* | 12/2021 | Li | G06F 3/041661 |

FOREIGN PATENT DOCUMENTS

CN   106886704 A   6/2017

OTHER PUBLICATIONS

International Search Report and Written Opinion—PCT/US2022/072632—ISA/EPO—dated Oct. 5, 2022.

* cited by examiner

*Primary Examiner* — Jonathan A Boyd
(74) *Attorney, Agent, or Firm* — QUALCOMM Incorporated

(57) ABSTRACT

Apparatuses, systems, and methods are provided for ultrasonic fingerprint sensors that feature an ultrasonic transmitter and multiple subsets of ultrasonic sensor pixels, each subset of ultrasonic sensor pixels associated with a different ultrasonically sensitive display surface, at least two of which are non-coplanar with one another. In some implementations, the ultrasonically sensitive display surfaces may be provided by different portions of a flexible display that has been flexed into a configuration in which two or more portions thereof are non-coplanar. In some instances, a controller may be provided that selectively reads ultrasonic sensor signals from subset(s) of the ultrasonic sensor pixels that are associated with the ultrasonically sensitive display surfaces that a touch-sensing system indicates are experiencing touch events.

20 Claims, 11 Drawing Sheets

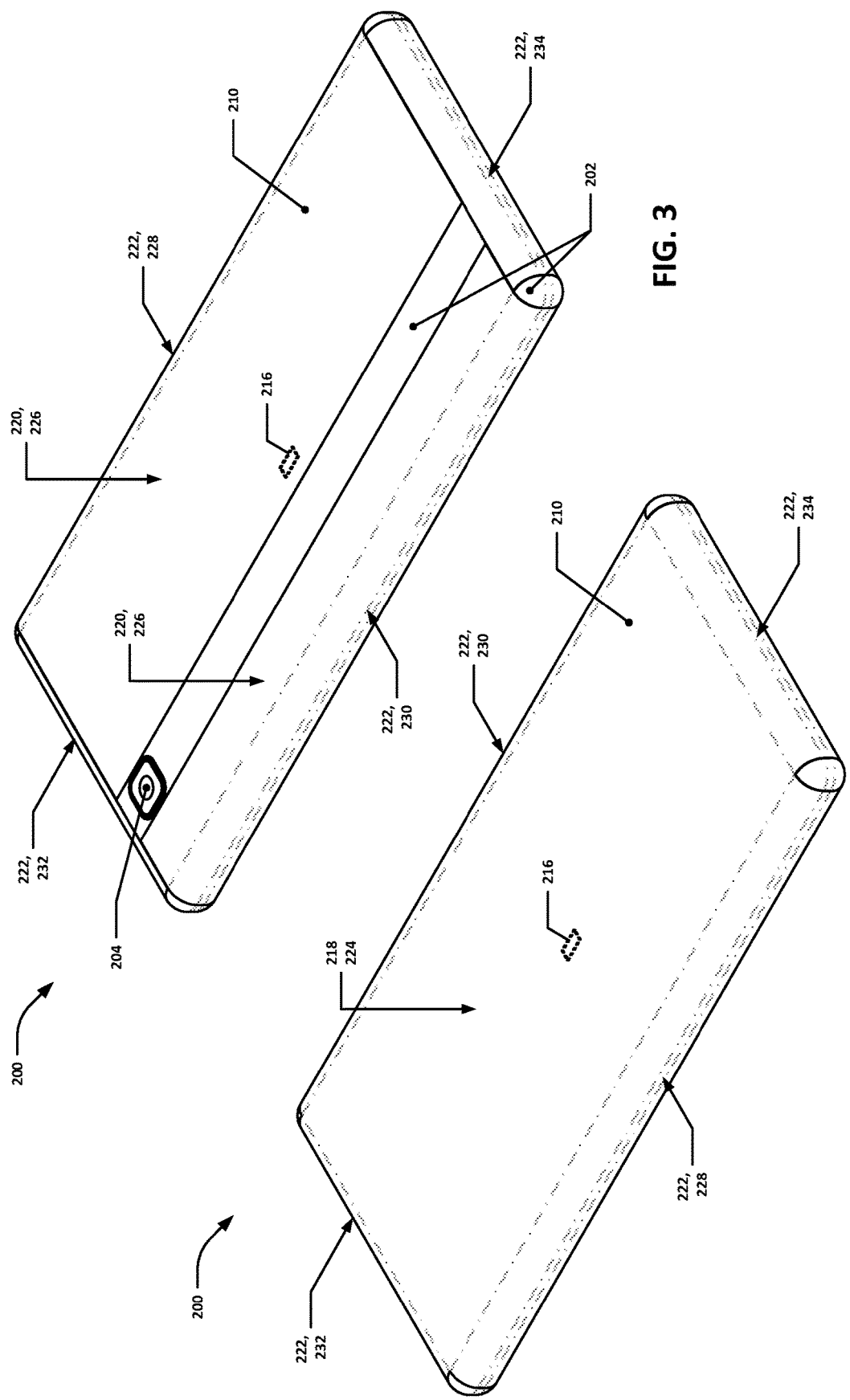

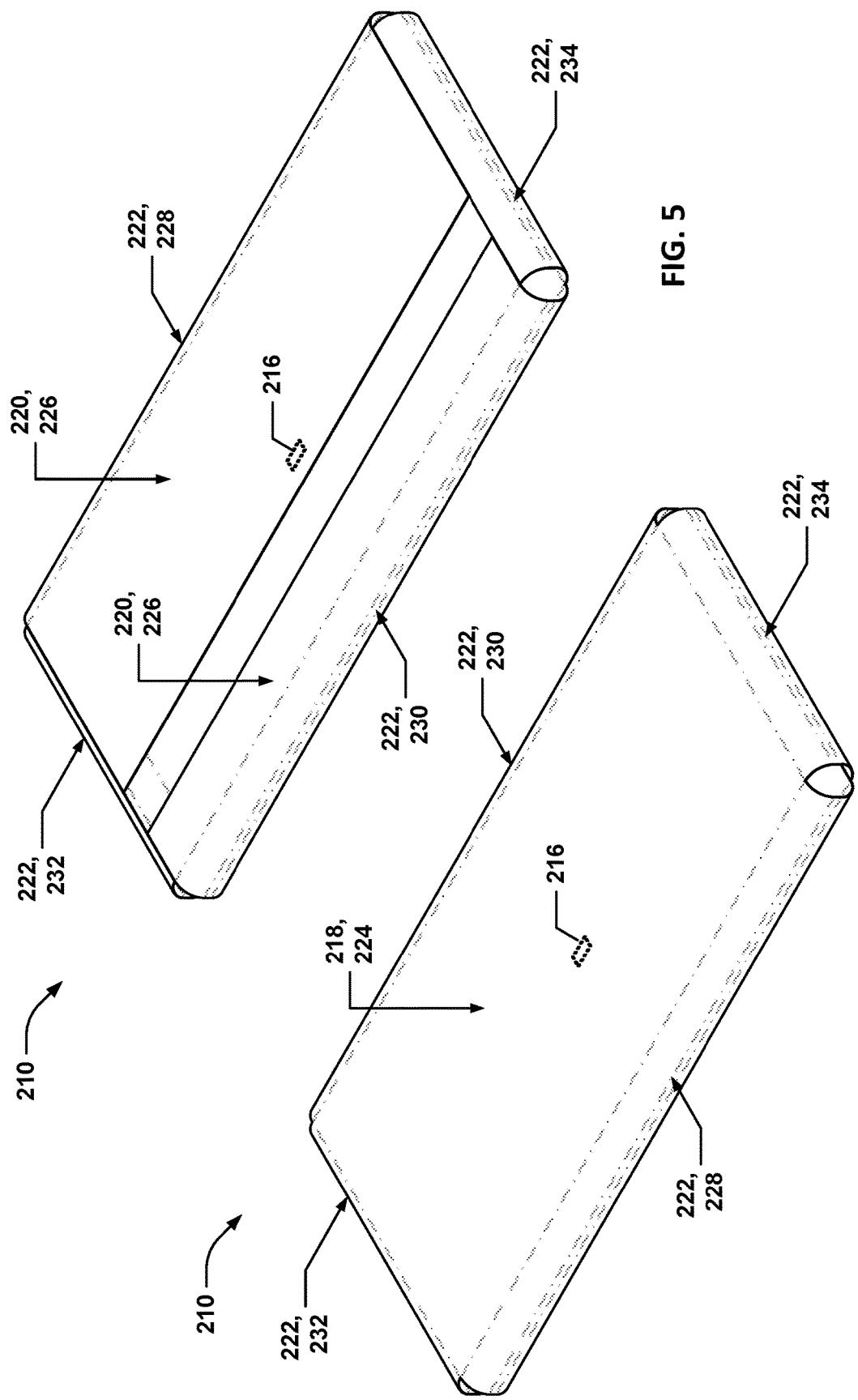

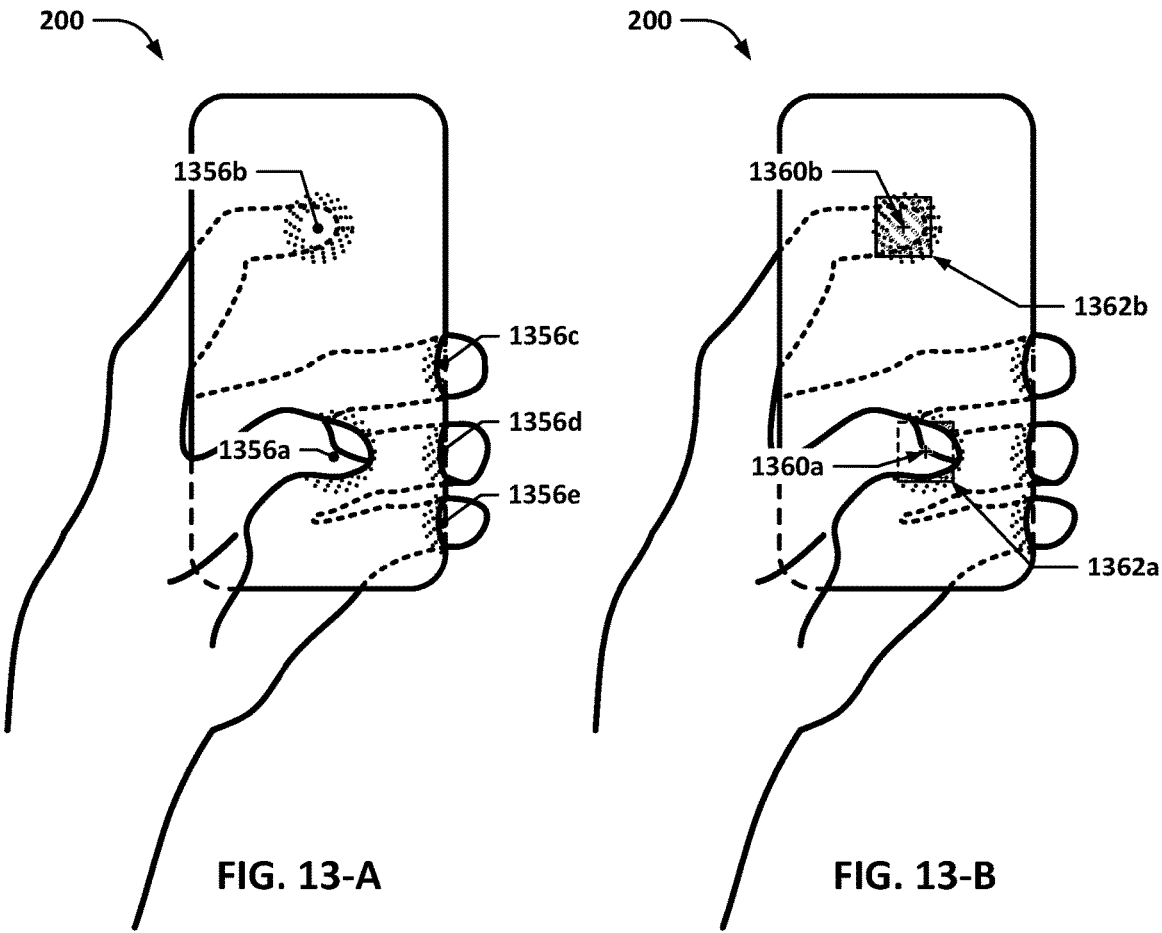
FIG. 13-A   FIG. 13-B
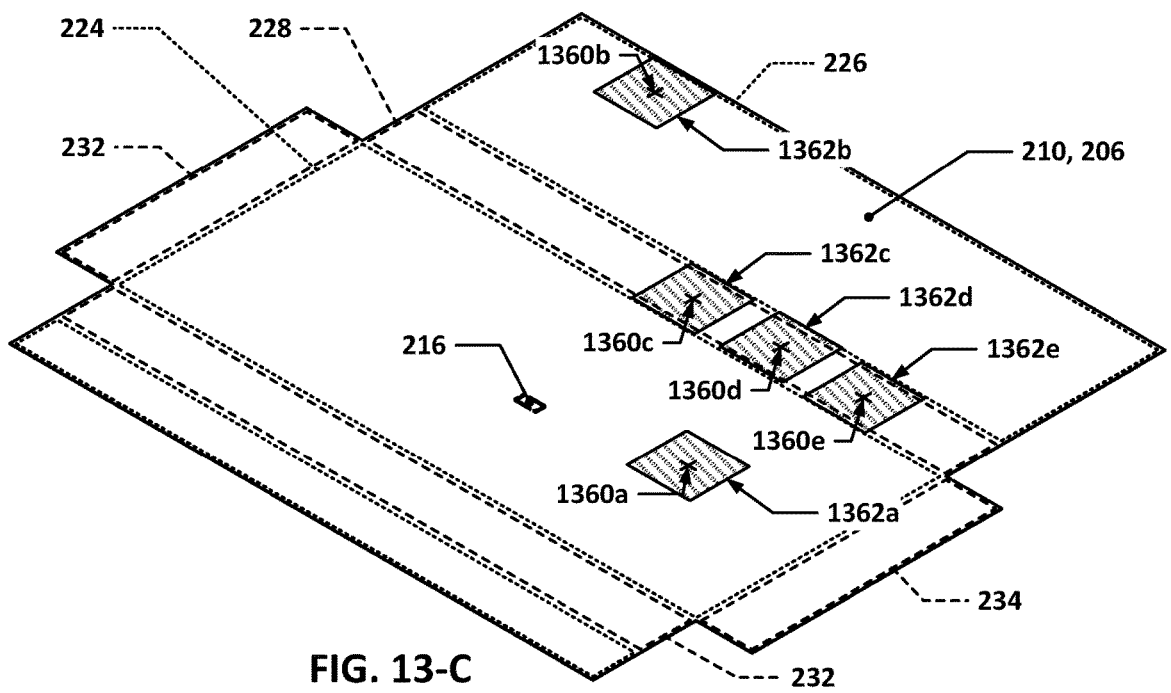
FIG. 13-C

ULTRASONIC FINGERPRINT SENSOR TECHNOLOGIES AND METHODS FOR MULTI-SURFACE DISPLAYS

TECHNICAL FIELD

This disclosure relates generally to fingerprint sensor devices and related methods, including but not limited to ultrasonic fingerprint sensor systems and methods for using such systems.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance under some conditions, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an ultrasonic fingerprint sensor system and an ultrasonic transmitter. In some examples, the apparatus may further include a controller. In some examples, the controller may include one or more memory devices, whereas in other examples the controller system may be configured for communication with one or more memory devices that are not part of the controller. According to some examples, the apparatus may be integrated into, or may be, a mobile device. The controller may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

In some implementations, an apparatus may be provided that includes an ultrasonic fingerprint sensor system including a plurality of ultrasonic sensor pixels, each ultrasonic sensor pixel configured to generate a corresponding ultrasonic sensor signal responsive to that ultrasonic sensor pixel detecting passage of an ultrasonic wave therethrough. The apparatus may further include a display system including at least one display, the display system including a plurality of ultrasonically sensitive display surfaces, each ultrasonically sensitive display surface associated with a different subset of display pixels of the display system and a different subset of the ultrasonic sensor pixels. At least two of the ultrasonically sensitive display surfaces may not be co-planar with each other. The apparatus may further include an ultrasonic transmitter that is not coextensive with the ultrasonically sensitive display surfaces. The ultrasonic transmitter may be configured to transmit one or more ultrasonic waves responsive to receipt of one or more input signals.

In some implementations, the ultrasonic transmitter may be configured to emit one or more ultrasonic waves that pass through all of the ultrasonically sensitive display surfaces.

In some implementations of the apparatus, the ultrasonic transmitter may be the only ultrasonic transmitter in the apparatus configured to be used to provide ultrasonic waves for detection by the ultrasonically sensitive display surfaces.

Some implementations of the apparatus may further include a housing. In such implementations, the housing may have a front side and a rear side facing in an opposite direction from the front side. A first ultrasonically sensitive display surface of the ultrasonically sensitive display surfaces may be on the front side of the housing and a second ultrasonically sensitive display surface of the ultrasonically sensitive display surfaces may be on the rear side of the housing.

In some such implementations of the apparatus, the housing may have an edge side spanning between the front side and the rear side, and a third ultrasonically sensitive display surface of the ultrasonically sensitive display surfaces may be on the edge side.

In some implementations of the apparatus, the ultrasonic transmitter may not be in the form of a thin sheet.

In some implementations of the apparatus, the ultrasonic transmitter may have a prismatic or cylindrical solid shape.

In some implementations, the ultrasonic transmitter may have a shape that is substantially proportional to a shape of the housing, and the ultrasonic transmitter may be substantially centered within the housing.

In some implementations of the apparatus, the apparatus may further include a touch-sensing system configured to independently detect when one or more of the ultrasonically sensitive display surfaces experiences a touch event, and a controller configured to: a) receive touch data from the touch-sensing system indicating one or more touch events for a subset of one or more of the ultrasonically sensitive display surfaces, b) cause, responsive to (a), the ultrasonic transmitter to transmit one or more ultrasonic waves, and c) obtain, responsive to (a), ultrasonic sensor signals from the ultrasonic sensor pixels associated with at least one ultrasonically sensitive display surface in the subset of one or more ultrasonically sensitive display surfaces.

In some implementations of the apparatus, the controller may be further configured to obtain fingerprint data based, at least in part, on the ultrasonic sensor signals.

In some implementations of the apparatus, the fingerprint data may be for between 1 and 10 fingers.

In some implementations of the apparatus, the controller may be further configured to perform an authentication process using the fingerprint data.

In some implementations, the controller may be further configured to d) detect when the touch data received from the touch-sensing system indicates that a first ultrasonically sensitive display surface and a second ultrasonically sensitive display surface of the plurality of ultrasonically sensitive display surfaces are both experiencing simultaneous touch events, and e) obtain, responsive to detecting that the touch data received from the touch-sensing system indicates that the first ultrasonically sensitive display surface and the second ultrasonically sensitive display surface of the plurality of ultrasonically sensitive display surfaces are both experiencing simultaneous touch events, first ultrasonic sensor signals from the first ultrasonically sensitive display surface and second ultrasonic sensor signals from the second ultrasonically sensitive display surface.

In some implementations of the apparatus, the controller may be further configured to obtain the first ultrasonic sensor signals from the first ultrasonically sensitive display surface for one or more time periods that are different from one or more time periods for which the second ultrasonic sensor signals are obtained.

In some implementations of the apparatus, the controller may be further configured to: obtain first fingerprint data based, at least in part, on the first ultrasonic sensor signals, and obtain second fingerprint data based, at least in part, on the second ultrasonic sensor signals.

In some implementations of the apparatus, the controller may be further configured to perform an authentication process using the first fingerprint data and the second fingerprint data.

In some implementations, a method may be provided that includes generating a non-planar ultrasonic wave responsive to receipt of one or more input signals and using an ultrasonic transmitter located within a housing of an apparatus having a) a display system with at least one display and a plurality of ultrasonically sensitive display surfaces, at least two of which are non-coplanar and each of which is associated with a different plurality of display pixels, and b) a plurality of ultrasonic sensor pixels, wherein each ultrasonic sensor pixel is associated with a different one of the ultrasonically sensitive display surfaces and the ultrasonic transmitter is not coextensive with the ultrasonically sensitive display surfaces. The method may further include obtaining ultrasonic sensor signals from a subset of the ultrasonic sensor pixels associated with at least one of the ultrasonically sensitive display surfaces.

In some implementations of the method, the method may further include causing the non-planar ultrasonic wave to pass through all of the ultrasonically sensitive display surfaces.

In some implementations of the method, the housing may have a front side and a rear side facing in an opposite direction from the front side, and a first ultrasonically sensitive display surface of the ultrasonically sensitive display surfaces may be on the front side of the housing and a second ultrasonically sensitive display surface of the ultrasonically sensitive display surfaces may be on the rear side of the housing.

In some implementations of the method, the housing may have an edge side spanning between the front side and the rear side, and a third ultrasonically sensitive display surface of the ultrasonically sensitive display surfaces may be on the edge side.

In some implementations of the method, the ultrasonic transmitter may not be in the form of a thin sheet.

In some implementations of the method, the ultrasonic transmitter may have a prismatic or cylindrical solid shape.

In some implementations of the method, the ultrasonic transmitter may have a shape that is substantially proportional to a shape of the housing and be substantially centered within the housing.

In some implementations of the method, the method may further include a) receiving touch data from a touch-sensing system of the apparatus indicating one or more touch events for a subset of one or more of the ultrasonically sensitive display surfaces, b) causing, responsive to (a), the ultrasonic transmitter to transmit the non-planar ultrasonic wave, and c) obtaining, responsive to (a), ultrasonic sensor signals from the ultrasonic sensor pixels associated with at least one ultrasonically sensitive display surface in the subset of one or more ultrasonically sensitive display surfaces.

In some implementations of the method, the method may further include obtaining fingerprint data based, at least in part, on the ultrasonic sensor signals.

In some implementations of the method, the fingerprint data may be for between 1 and 10 fingers.

In some implementations of the method, the method may further include performing an authentication process using the fingerprint data.

In some implementations of the method, the method may further include d) detecting when the touch data received from the touch-sensing system indicates that a first ultrasonically sensitive display surface and a second ultrasonically sensitive display surface of the plurality of ultrasonically sensitive display surfaces are both experiencing simultaneous touch events, and e) obtaining, responsive to detecting that the touch data received from the touch-sensing system indicates that the first ultrasonically sensitive display surface and the second ultrasonically sensitive display surface of the plurality of ultrasonically sensitive display surfaces are both experiencing simultaneous touch events, first ultrasonic sensor signals from the first ultrasonically sensitive display surface and second ultrasonic sensor signals from the second ultrasonically sensitive display surface.

In some implementations of the method, the method may further include obtaining the first ultrasonic sensor signals from the first ultrasonically sensitive display surface for one or more time periods that are different from one or more time periods for which the second ultrasonic sensor signals are obtained.

In some implementations of the method, the method may further include obtaining first fingerprint data based, at least in part, on the first ultrasonic sensor signals, and obtaining second fingerprint data based, at least in part, on the second ultrasonic sensor signals.

In some implementations of the method, the method may further include performing an authentication process using the first fingerprint data and the second fingerprint data.

In some implementations, a non-transitory computer-readable medium may be provided which stores computer-executable instructions which, when executed by one or more processors, cause the one or more processors to: cause an ultrasonic transmitter located within a housing of an apparatus to generate a non-planar ultrasonic wave responsive to receipt of one or more input signals, the apparatus having a) a display system with at least one display and a plurality of ultrasonically sensitive display surfaces, at least two of which are non-coplanar and each of which is associated with a different plurality of display pixels, and b) a plurality of ultrasonic sensor pixels, wherein each ultrasonic sensor pixel is associated with a different one of the ultrasonically sensitive display surfaces and the ultrasonic transmitter is not coextensive with the ultrasonically sensitive display surfaces; and cause ultrasonic sensor signals to be obtained from a subset of the ultrasonic sensor pixels associated with at least one of the ultrasonically sensitive display surfaces.

In some implementations of the non-transitory computer-readable medium, the non-planar ultrasonic wave may be caused to pass through all of the ultrasonically sensitive display surfaces.

In some implementations of the non-transitory computer-readable medium, the housing may have a front side and a rear side facing in an opposite direction from the front side, and a first ultrasonically sensitive display surface of the ultrasonically sensitive display surfaces may be on the front side of the housing and a second ultrasonically sensitive display surface of the ultrasonically sensitive display surfaces may be on the rear side of the housing.

In some implementations of the non-transitory computer-readable medium, the housing may have an edge side spanning between the front side and the rear side, and a third ultrasonically sensitive display surface of the ultrasonically sensitive display surfaces may be on the edge side.

In some implementations of the non-transitory computer-readable medium, the ultrasonic transmitter may not be in the form of a thin sheet.

In some implementations of the non-transitory computer-readable medium, the ultrasonic transmitter may have a prismatic or cylindrical solid shape.

In some implementations of the non-transitory computer-readable medium, the ultrasonic transmitter may have a shape that is substantially proportional to a shape of the housing, and the ultrasonic transmitter may be substantially centered within the housing.

In some implementations of the non-transitory computer-readable medium, the non-transitory computer-readable medium may further store additional computer-executable instructions which, when executed by one or more processors, cause the one or more processors to: a) cause touch data to be obtained from a touch-sensing system of the apparatus indicating one or more touch events for a subset of one or more of the ultrasonically sensitive display surfaces, b) cause, responsive to (a), the ultrasonic transmitter to transmit the non-planar ultrasonic wave, and c) obtain, responsive to (a), ultrasonic sensor signals from the ultrasonic sensor pixels associated with at least one ultrasonically sensitive display surface in the subset of one or more ultrasonically sensitive display surfaces.

In some implementations of the non-transitory computer-readable medium, the non-transitory computer-readable medium may further store additional computer-executable instructions which, when executed by one or more processors, cause the one or more processors to obtain fingerprint data based, at least in part, on the ultrasonic sensor signals.

In some implementations of the non-transitory computer-readable medium, the fingerprint data is for between 1 and 10 fingers.

In some implementations of the non-transitory computer-readable medium, the non-transitory computer-readable medium may further store additional computer-executable instructions which, when executed by one or more processors, cause the one or more processors to perform an authentication process using the fingerprint data.

The non-transitory computer-readable medium of implementation 39, wherein the non-transitory computer-readable medium may further store additional computer-executable instructions which, when executed by one or more processors, cause the one or more processors to: d) detect when the touch data received from the touch-sensing system indicates that a first ultrasonically sensitive display surface and a second ultrasonically sensitive display surface of the plurality of ultrasonically sensitive display surfaces are both experiencing simultaneous touch events, and e) obtain, responsive to detecting that the touch data received from the touch-sensing system indicates that the first ultrasonically sensitive display surface and the second ultrasonically sensitive display surface of the plurality of ultrasonically sensitive display surfaces are both experiencing simultaneous touch events, first ultrasonic sensor signals from the first ultrasonically sensitive display surface and second ultrasonic sensor signals from the second ultrasonically sensitive display surface.

In some implementations of the non-transitory computer-readable medium, the non-transitory computer-readable medium may further store additional computer-executable instructions which, when executed by one or more processors, cause the one or more processors to obtain the first ultrasonic sensor signals from the first ultrasonically sensitive display surface for one or more time periods that are different from one or more time periods for which the second ultrasonic sensor signals are obtained.

In some implementations of the non-transitory computer-readable medium, the non-transitory computer-readable medium may further store additional computer-executable instructions which, when executed by one or more processors, cause the one or more processors to: obtain first fingerprint data based, at least in part, on the first ultrasonic sensor signals, and obtain second fingerprint data based, at least in part, on the second ultrasonic sensor signals.

In some implementations of the non-transitory computer-readable medium, the non-transitory computer-readable medium may further store additional computer-executable instructions which, when executed by one or more processors, cause the one or more processors to perform an authentication process using the first fingerprint data and the second fingerprint data.

In some implementations, an apparatus may be provided that includes means for ultrasonically sensing fingerprints from a plurality of non-coplanar surfaces, means for displaying graphical content on the plurality of non-coplanar surfaces, and ultrasonic transmission means that is not coextensive with the means for ultrasonically sensing fingerprints, the ultrasonic transmission means configured to generate and transmit one or more ultrasonic waves responsive to receipt of one or more input signals.

In some implementations of the apparatus, the ultrasonic transmission means may be configured to emit one or more ultrasonic waves that pass through all of the surfaces on which graphical content can be displayed.

In some implementations of the apparatus, the ultrasonic transmission means may be the only ultrasonic transmission means in the apparatus configured to be used to provide ultrasonic waves for detection by the means for ultrasonically sensing fingerprints from the plurality of non-coplanar surfaces.

In some implementations of the apparatus, the apparatus may further include housing means. The housing means may have a front side and a rear side facing in an opposite direction from the front side, and the plurality of non-coplanar surfaces may include the front side of the housing means and the rear side of the housing means.

In some implementations of the apparatus, the housing means may have an edge side spanning between the front side and the rear side, and the plurality of non-coplanar surfaces may further include the edge side.

In some implementations of the apparatus, the ultrasonic transmission means may not be in the form of a thin sheet.

In some implementations of the apparatus, the ultrasonic transmission means may have a prismatic or cylindrical solid shape.

In some implementations of the apparatus, the ultrasonic transmission means may have a shape that is substantially proportional to a shape of the housing means, and the ultrasonic transmission means may be substantially centered within the housing means.

In some implementations of the apparatus, the apparatus may include touch-sensing means for detecting when one or more of the plurality of non-coplanar surfaces experience a touch event, and control means for: a) receiving touch data from the touch-sensing means indicating one or more touch events for a subset of one or more of the non-coplanar surfaces, b) causing, responsive to (a), the ultrasonic transmission means to transmit one or more ultrasonic waves, and c) obtaining, responsive to (a), ultrasonic sensor signals from the means for ultrasonically sensing fingerprints associated with at least one surface in the plurality of non-coplanar surfaces.

In some implementations of the apparatus, the control means may be for obtaining fingerprint data based, at least in part, on the ultrasonic sensor signals.

In some implementations of the apparatus, the fingerprint data may be for between 1 and 10 fingers.

In some implementations of the apparatus, the control means may further be for performing an authentication process using the fingerprint data.

In some implementations of the apparatus, the control means may further be for d) detecting when the touch data received from the touch-sensing means indicates that a first surface and a second surface of the plurality of non-coplanar surfaces are both experiencing simultaneous touch events, and e) obtaining, responsive to detecting that the touch data received from the touch-sensing means indicates that the first surface and the second surface of the plurality of non-coplanar surfaces are both experiencing simultaneous touch events, first ultrasonic sensor signals from the first surface and second ultrasonic sensor signals from the second surface via the means for ultrasonically sensing fingerprints.

In some implementations of the apparatus, the control means may further be for obtaining the first ultrasonic sensor signals from the first surface for one or more time periods that are different from one or more time periods for which the second ultrasonic sensor signals are obtained.

In some implementations of the apparatus, the control means may be further for: obtaining first fingerprint data based, at least in part, on the first ultrasonic sensor signals, and obtaining second fingerprint data based, at least in part, on the second ultrasonic sensor signals.

In some implementations of the apparatus, the control means may further be for performing an authentication process using the first fingerprint data and the second fingerprint data.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. For example, the software may include instructions for controlling one or more devices to perform a method.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIGS. 2 and 3 depict isometric views of the front and rear sides of an apparatus.

FIGS. 4 and 5 depict isometric views of the front and rear sides of a display system of the apparatus of FIGS. 2 and 3.

FIGS. 13-A and 13-B depict an example apparatus, e.g., such as the apparatus of FIG. 2, being held in a user's hand.

FIG. 13-C shows a display system and the associated ultrasonic fingerprint sensor system of the apparatus of FIGS. 13-A and 13-B.

Figure 1:
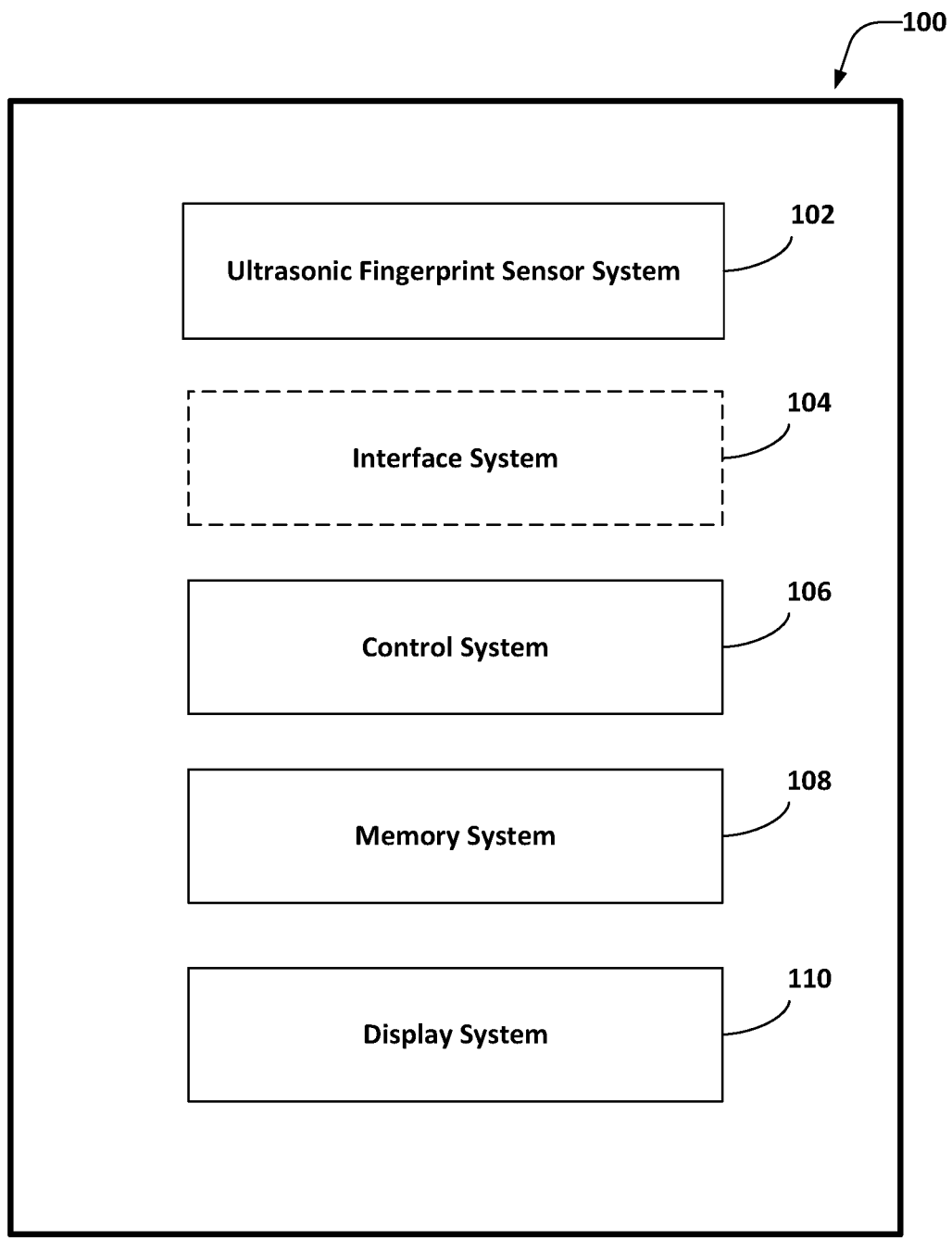
FIG. 1 is a block diagram that shows example components of an apparatus according to some disclosed implementations.

The Figures are provided to facilitate understanding of the concepts discussed in this disclosure, and are intended to be illustrative of some implementations that fall within the scope of this disclosure, but are not intended to be limiting— implementations consistent with this disclosure and which are not depicted in the Figures are still considered to be within the scope of this disclosure.

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, Bluetooth® devices, personal data assistants (PDAs), wireless electronic mail receivers, hand-held or portable computers, netbooks, notebooks, smartbooks, tablets, global positioning system (GPS) receivers/navigators, cameras, digital media players (such as MP3 players), camcorders, game consoles, clocks, calculators, television monitors, flat panel displays, electronic reading devices (e.g., e-readers), mobile health devices, computer monitors, electronic photographs, stereo systems, DVD players, CD players, VCRs, radios, portable memory chips, parking meters, aesthetic structures (such as display of images on a piece of jewelry or clothing) and a variety of EMS devices. The teachings herein also may be used in applications such as, but not limited to, parts of consumer electronics products, liquid crystal devices, and electrophoretic devices. Thus, the teachings are not intended to be limited to the implementations depicted solely in the Figures, but instead have wide applicability as will be readily apparent to one having ordinary skill in the art.

Using fingerprints for authentication, e.g., to allow a particular user access to a particular device or to authenticate a transaction performed with a device is now commonplace.

As used herein, the term "finger" may refer to any digit of the hand, including a thumb. Accordingly, a thumbprint is to be understood to also constitute a "fingerprint" for the purposes of this disclosure. Similarly, reference to "fingers" is to be understood to be inclusive of "fingers and thumbs" for the purpose of this disclosure Thus, for example, reference to "all ten of a person's fingers" is to be understood to refer to all ten digits of both of the person's hands.

One particular type of fingerprint sensor that may be used for fingerprint authentication purposes is an ultrasonic fingerprint sensor. Existing ultrasonic fingerprint sensors include a stack of multiple layers that can be placed, for example, underneath a display of a device and used to read fingerprints through the display of the device. Such ultrasonic fingerprint sensors may include a piezoelectric transmitter layer, a piezoelectric sensor material layer, and a sensor pixel layer. In some such ultrasonic fingerprint sensors, the piezoelectric transmitter layer and the piezoelectric sensor material layer may be the same layer of piezoelectric material, e.g., the same piezoelectric material may be used to both generate ultrasonic waves responsive to application of an electrical potential across the material and to convert reflected ultrasonic waves received by the piezoelectric material into an electrical potential that can be measured by the sensor pixel layer.

In such ultrasonic fingerprint sensors, the piezoelectric transmitter layer, the piezoelectric sensor material layer, and the sensor pixel layer are typically coextensive, i.e., each such layer (or at least the portions thereof actively involved in obtaining fingerprint readings) may be generally the same size and shape and overlap each other completely.

This disclosure relates to new types of ultrasonic fingerprint sensors that may be used in devices in which it may be desired to obtain fingerprint readings from multiple, non-coplanar surfaces of the device. In some implementations, such surfaces may have surface normals that are not in the same direction, e.g., the front and back sides of a device may be parallel but have surface normals that face in opposite directions.

Such devices may include, for example, devices that use display systems with discrete display panels located on different sides of such devices, e.g., a laptop, phone, or tablet device that may have a main display panel positioned so as to show graphical content via a display surface on one side of the device and a secondary display panel positioned so as to show graphical content via a secondary display surface on another side of the device, e.g., an opposite side of the device.

Such devices may also include, for example, devices that leverage recent developments in flexible display technology to allow for display systems with a display panel or display panels that are flexible and that may thus be used to provide displays that seamlessly "wrap" around multiple sides of a device. For example, a mobile phone may have a display that extends across a major surface of the phone and wraps around one long side of the phone so as to extend across another major surface of the phone on a side of the phone opposite the initial major surface of the phone.

It will be understood that a "display system," as the term is used herein, refers to one or more multi-pixel displays that may be controlled to changeably display graphical content. For the purposes of discussion in this disclosure, reference may also be made to a "display surface" of a display system. A display surface is to be understood to refer to a surface of an apparatus that can be caused to display graphical content responsive to various control signals, i.e., a display surface includes a plurality of display pixels that may be controlled so as to display graphical content. A display surface is to be understood to generally correspond with a surface of a device. For example, a device that features a display system with two discrete display panels facing in opposite directions would have a display system with two display surfaces. In another example, a device that features a display system with a single flexible display panel that extends across the front and back of the device, as well as across one side spanning between the front and back of the device, would be understood to potentially have at least three display surfaces—one extending across the front of the device, another across the rear of the device, and a third extending across the above-mentioned side of the device. Rounded transitions between different display surfaces may, for example, be viewed as either being part of one or both of the surfaces being transitioned between (e.g., a 90° rounded corner joining two display surfaces may be viewed as being an extension of either of the two display surfaces or, for example, 45° of the 90° corner adjacent to one such display surface may be viewed as being an extension of that display surface, and the other 45° thereof may be viewed as being an extension of the other display surface) or may each be viewed as its own separate display surface separate from the two display surfaces that such a rounded surface transitions between. In the above example, the front, rear, and side display surfaces are all non-coplanar to one another, although the front and rear display surfaces may be parallel to one another.

The ultrasonic fingerprint sensors discussed herein decouple the ultrasonic transmission element from the layer stack that includes the piezoelectric sensor material layer and the sensor pixel layer. For example, in a typical ultrasonic fingerprint sensor, there is either a single piezoelectric layer that serves as both a piezoelectric ultrasonic transmitter and a piezoelectric ultrasonic receiver (a piezoelectric sensor material layer) or two separate piezoelectric layers, one that is used as the piezoelectric ultrasonic transmitter and another that is used as the piezoelectric ultrasonic receiver. In either case, the piezoelectric layer(s) generally extend across at least the entire active area of the fingerprint sensor in which they are used. Due to the generally two-dimensional nature of the piezoelectric transmitter layer, the ultrasonic waves that are generated are generally planar in nature and have wave fronts that travel in a direction nominally perpendicular to the major plane of the ultrasonic transmitter layer.

In the ultrasonic fingerprint sensor systems discussed herein, the planar ultrasonic transmitter layer (if separate from the ultrasonic receiver layer) of the layer stack of a typical ultrasonic fingerprint sensor is omitted and replaced with a compact, piezoelectric (or photoacoustic) element that is a) not part of the layer stack and b) much smaller in surface area than the surface area of the ultrasonic transmitter layer that would normally be used, i.e., much smaller in surface area than the piezoelectric sensor material layer (which would normally be equal to or generally equivalent in area to the area of the piezoelectric ultrasonic transmitter layer). Moreover, the ultrasonic transmitter that is used may be shared between the piezoelectric sensor material layers and the sensor pixel layers associated with different non-coplanar display surfaces. Thus, the ultrasonic transmitter that is used may provide ultrasonic waves in multiple directions simultaneously, radiating ultrasonic waves through the device omnidirectionally and through the piezoelectric sensor material layer and the sensor pixel layer associated with each display surface having ultrasonic fingerprint sensing capability. Reflections of ultrasonic waves from objects, e.g., fingertips, in contact with such display surfaces may then be detected by the ultrasonic fingerprint sensor system ultrasonic sensor pixels proximate those ultrasonically sensitive display surfaces. In some such implementations, the ultrasonic transmitter that is used may be the only ultrasonic transmitter within the apparatus.

In some implementations, the ultrasonic transmitter may be sized so as to have an aspect ratio that is similar to that of the apparatus in which it is used, e.g., generally proportional to the shape of the housing of the apparatus. For example, if the ultrasonic transmitter is used in a smartphone having a length of 160 mm, a width of 80 mm, and a thickness of 8 mm (a 20:10:1 length/width/thickness aspect ratio), then the ultrasonic transmitter may be sized so as to have a generally similar aspect ratio (and be oriented in the same manner). For example, the ultrasonic transmitter in such a device may, for example, have a length of 8 mm, a width of 4 mm, and a thickness of 0.4 mm. In some such implementations, the dimensions of the ultrasonic transmitter may each be within ±10% of the values of those dimensions after being multiplied by a common scaling factor, e.g., 0.05. Thus, for example, an ultrasonic transmitter such as the example above, e.g., for an apparatus having a length of 160 mm, a width of 80 mm, and a thickness of 8 mm, may have a length of between 7.2 mm to 8.8 mm (±10% of 8 mm), a width of between 3.6 mm and 4.4 mm (±10% of 4 mm), and a thickness of between 0.36 mm and 0.44 mm (±10% of 0.4 mm). Concentrating the ultrasonic transmitter into a smaller, more point-source like form factor may allow the overall device thickness to be reduced (or kept the same but the used for other purposes) since the thicknesses that would normally be used to accommodate a much larger surface area piezoelectric layer would not be needed.

In some such or alternate implementations, the ultrasonic transmitter may be dimensioned such that the exterior surface area of the ultrasonic transmitter is less than or equal to 10% of the exterior surface area of the apparatus housing.

In some such implementations, the ultrasonic transmitter may also be substantially centered within the housing, e.g., within ±10% of the height, width, or length of the center of the apparatus with respect to the directions along which those dimensions are measured. If the ultrasonic transmitter is particularly thin in one direction, e.g., having a dimension in one direction that is an order or magnitude or more smaller in that direction as compared with the other dimensions of the ultrasonic transmitter in the other directions, then in some implementations, the ultrasonic transmitter may be positioned within as much as ±25% of the dimension of the housing of the apparatus in that direction. Thus, taking the example provided above, the ultrasonic transmitter for an apparatus having a length of 160 mm, a width of 80 mm, and a thickness of 8 mm may be centered on a location between ±16 mm (±10% of 160 mm) along the length axis of the apparatus from the center point of the apparatus, between ±8 mm (±10% of 80 mm) along the width axis of the apparatus from the center point of the apparatus, and between ±2 mm (±25% of 8 mm) along the thickness axis of the apparatus from the center point of the apparatus. Such positioning may provide more uniform or uniform coverage with regard to the ultrasonic waves that are generated therefrom, thereby resulting in more uniform fingerprint sensing performance.

In some implementations, such systems may be coupled with other sensor technologies, e.g., touchscreen sensors, to allow for selective reading of data from only subsets of ultrasonic sensor pixels that are associated with display surfaces which such other sensor technologies indicate are currently in contact with an object, e.g., a finger.

Such implementations allow for simultaneous, or near-simultaneous, fingerprint detection from multiple, differently oriented surfaces of a device. Such implementations may also provide for reduced power consumption as compared with ultrasonic fingerprint sensor systems that utilize ultrasonic transmitter layers that extend across the entire active area of the ultrasonic fingerprint sensor system, as the amount of power that may be required to cause the ultrasonic transmission element to generate ultrasonic waves may be reduced as compared with the amount of power that may be required to cause an ultrasonic transmitter layer or layers to generate ultrasonic waves. This benefit may be particularly evident in apparatuses that feature multiple ultrasonically sensitive display surfaces on different sides of the apparatus, as the same ultrasonic transmission element may be used with 2, 3, 4, 5, 6, or more piezoelectric ultrasonic receiver layers. In such an example, the surface area of the ultrasonic transmission element may stay the same while the surface area of the ultrasonic receiver layers used may fluctuate based on the number of different ultrasonically sensitive surfaces that receive the ultrasonic waves generated by the ultrasonic transmission element. If traditional ultrasonic fingerprint sensor technologies were to be used instead, the surface area of the ultrasonic transmission layers would scale with the surface area of the ultrasonic receiver layers, e.g., a device having traditional ultrasonic fingerprint sensors on both the front and back sides of the device would have piezoelectric ultrasonic transmitter layers with twice as much surface area as would be present in a similar device with a traditional ultrasonic fingerprint sensor on only the front side or the back side of the device. In contrast, if the same device were to use the ultrasonic fingerprint sensor systems as described herein, e.g., having an ultrasonic transmission element that is not a layer in the layer stack having the ultrasonic receiver layer, the surface area of the ultrasonic transmission element may remain the same regardless of whether the device had an ultrasonically sensitive display surface on only on the front side, both the front and the back sides, or on the front, back, and other sides.

By using a single ultrasonic transmission element to provide ultrasonic waves that are potentially receivable by multiple different ultrasonic receiver layers, such implementations may, as compared with ultrasonic fingerprint sensors that feature discrete piezoelectric ultrasonic transmission and receiver layers, offer a reduced cost since multiple piezoelectric ultrasonic transmission layers may be omitted and replaced with a single ultrasonic transmission element. With respect to ultrasonic fingerprint sensors that use the same piezoelectric material layer as both the ultrasonic transmission layer and the ultrasonic receiver layer, there may not be any reduction in the number of ultrasonic layers since each ultrasonically sensitive display region would, in either case, have a single ultrasonic layer. However, ultrasonic fingerprint sensors that include single piezoelectric layers that are used for both transmission and reception of ultrasonic waves may sometimes experience reduced operational lifetimes as compared with ultrasonic fingerprint sensors that use separate piezoelectric layers (or elements) for ultrasonic transmission and reception. For example, a single piezoelectric layer that is used to both transmit and receive ultrasonic waves sees twice as much active use during a single fingerprint reading operation as either of two discrete piezoelectric layers, one of which is used to transmit ultrasonic waves and the other of which is used to receive ultrasonic waves. Accordingly, ultrasonic fingerprint sensors such as those discussed herein that utilize a discrete piezoelectric ultrasonic transmission element may provide enhanced operational lifetime as compared with ultrasonic fingerprint sensors that use a single piezoelectric material layer to provide for both transmission and reception of ultrasonic waves.

FIG. 1 is a block diagram that shows example components of an apparatus according to some disclosed implementations. In this example, the apparatus 100 includes an ultrasonic fingerprint sensor system 102, a control system 106, a memory system 108, and a display system 110. In some implementations, the apparatus 100 may include an interface system 104.

The ultrasonic fingerprint sensor system 102 may include an ultrasonic omnidirectional wave generator. The ultrasonic fingerprint sensor system 102 may also include a piezoelectric receiver layer, such as a layer of polyvinylidene fluoride PVDF polymer or a layer of polyvinylidene fluoride-trifluoroethylene (PVDF-TrFE) copolymer. The ultrasonic fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc.

Data received from the ultrasonic fingerprint sensor system 102 may sometimes be referred to herein as "fingerprint sensor data," "fingerprint image data," "ultrasonic fingerprint data," "ultrasonic signals," etc., although the data will generally be received from the fingerprint sensor system in the form of electrical signals that are then processed by one or processors. Accordingly, without additional processing such image data would not necessarily be perceivable by a human being as an image.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In this example, the control system 106 is configured for communication with, and for controlling, the ultrasonic fingerprint sensor system 102 and the display system 110. According to some examples, the control system 106 may include a dedicated component for controlling the ultrasonic fingerprint sensor system 102. In this example, the control system 106 is also configured for communication with the memory system 108. According to some examples, the control system 106 also may include one or more memory devices, such as one or more random access memory (RAM) devices, read-only memory (ROM) devices, etc. In some implementations, functionality of the control system 106 may be partitioned between one or more controllers or processors, such as between a dedicated sensor controller and an applications processor of a mobile device.

In this example, the memory system 108 includes one or more memory devices, such as one or more RAM devices, ROM devices, etc. In some examples, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

Some implementations of the apparatus 100 may include an interface system 104. In some examples, the interface system 104 may include a wireless interface system. In some implementations, the interface system 104 may include a user interface system, one or more network interfaces, one or more interfaces between the control system 106 and the ultrasonic fingerprint sensor system 102, one or more interfaces between the control system 106 and the memory system 108, one or more interfaces between the control system 106 and the display system 110, and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 100. In some such examples, the interface system 104 may be configured to provide communication between the control system 106 and the ultrasonic fingerprint sensor system 102. According to some such examples, the interface system 104 may couple at least a portion of the control system 106 to the ultrasonic fingerprint sensor system 102, e.g., via electrically conducting material (e.g., via conductive metal wires or traces). According to some examples, the interface system 104 may be configured to provide communication between the apparatus 100 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a serial peripheral interface (SPI)).

In this implementation, the apparatus 100 includes a display system 110. In some such examples, the display system 110 may include layers, which may be referred to collectively as a "display stack." In some examples, the display system 110 may be, or may include, a light-emitting diode (LED) display, such as an organic light-emitting diode (OLED) display.

The apparatus 100 may be used in a variety of different contexts, some examples of which are disclosed herein. For example, in some implementations a mobile device may include at least a portion of the apparatus 100. In some implementations, a wearable device may include at least a portion of the apparatus 100. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

While the above discussion provides a general overview of the elements of various devices that may be used to implement the concepts discussed herein, the following Figures provide additional details that provide further insight as to the concepts discussed above.

FIGS. 2 and 3 depict isometric views of the front and rear sides of an apparatus 200, respectively. The apparatus 200 in this example is a smartphone or similar device, but it will be appreciated that other devices may be used in place of the apparatus 200 and configured in a similar or analogous manner. The apparatus 200 has a housing 202 that is, in this example, surrounded on nearly all sides by a wrap-around display system 210. The wrap-around display system 210, for example, is paired with an ultrasonic fingerprint sensor system (not separately shown here) that includes subsets of ultrasonic sensor pixels, each subset of ultrasonic sensor pixels providing, in concert with the portion of the display system 210 overlaying and proximate thereto, ultrasonically sensitive display surfaces, such as a first ultrasonically sensitive display surface 224 (located on a front side 218 of the apparatus 200), second ultrasonically sensitive display surfaces 226 and 226' (located on a rear side 220 of the apparatus 200), and third, fourth, fifth, and sixth ultrasonically sensitive display surfaces 228, 230, 232, and 234, respectively, all of which are located on different respective edge sides 222 of the apparatus 200. It will be understood that the implementations discussed herein are also inclusive of apparatuses, devices, and systems (apparatus will be used herein to refer to apparatuses as well as systems and devices) that feature display systems that have ultrasonically sensitive display surfaces on at least two, but less or more than the six sides or surfaces of the apparatus 200. For example, some apparatuses may have ultrasonically sensitive display surfaces on only two or three surfaces of the apparatus, whereas other apparatuses may have more than six sides and may also have ultrasonically sensitive display surfaces on more than six sides or surfaces thereof.

Also shown in FIGS. 2 and 3 is an ultrasonic transmitter 216, which is shown in dotted lines to indicate that it is located within the interior of the apparatus 200 and not actually externally visible. The ultrasonic transmitter 216 is generally centrally located within the apparatus 200, although may be located elsewhere within the apparatus in other implementations. In some implementations, open spaces or gaps within the interior of the housing 202 may optionally be wholly or partially filled with a gel substance to help with acoustic coupling between the ultrasonic transmitter 216 and the housing 202 and other elements of the apparatus 200. Such material may reduce the number and/or severity of acoustic impedance mismatches that an ultrasonic wave may encounter when transiting within the interior of the apparatus, thereby reducing the number and magnitude of potential reflection artifacts that may be generated when an ultrasonic wave passes through the housing 202 after being generated by the ultrasonic transmitter 216.

It will be understood that the display system 210 of the apparatus 200 may be configured to provide graphical content, e.g., images, animations, text, etc., on nearly all surfaces of the apparatus 200 responsive to control signals provided by a controller of the apparatus 200. The display system 210 in this example may, for example, be a flexible-substrate display system, such as a display system using flexible active-matrix organic light emitting diode (AMOLED), plastic organic light emitting diode (POLED), flexible passive-matrix organic light emitting diode (PMOLED), or other suitable flexible display technology.

FIGS. 4 and 5 show the display system 210 of FIGS. 2 and 3 with the housing 202 omitted. While not evident in these figures due to the thin nature of the ultrasonic fingerprint sensor system, the ultrasonic fingerprint sensor system may be positioned underneath the display system 210, or at least portions thereof.

Figure 6:
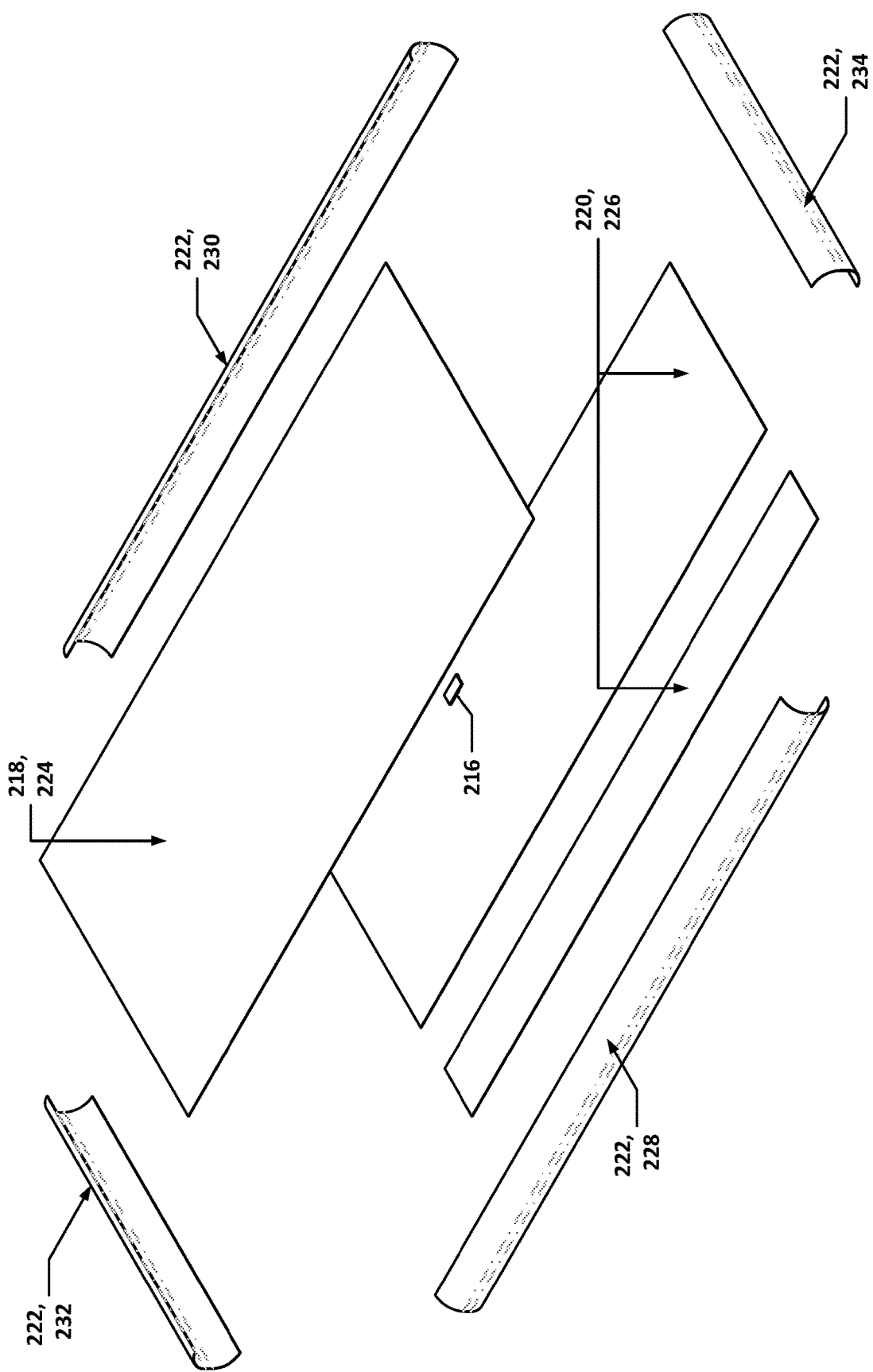
FIG. 6 depicts an exploded view of the display system of FIGS. 4 and 5.

FIG. 6 depicts an exploded view of the display system 210 of FIGS. 4 and 5, with each of the first through sixth ultrasonically sensitive display surfaces 224-234 shown as discrete surfaces. In this example, these ultrasonically sensitive display surfaces are simply different ultrasonically sensitive display surfaces of one contiguous structure, but in other implementations, two or more ultrasonically sensitive display surfaces may be provided by different discrete structures, e.g., two or more separate displays that are not part of a single integrated substrate. Also shown in FIG. 6 is the ultrasonic transmitter 216. The ultrasonic transmitter 216 may, for example, be provided by a small piece, e.g., a rectangular or prismatic solid or a cylindrical solid, that is electrically connected in series between two electrodes that may be used to provide an excitation voltage across the ultrasonic transmitter 216 in order to cause it to generate an ultrasonic wave. In some implementations, the ultrasonic transmitter 216 may alternatively be made of a photoacoustic material that is optically coupled with a light source that may be controlled to turn on and off so as to stimulate (and stop stimulating) the photoacoustic material so as to cause the photoacoustic material to generate an ultrasonic wave.

Figure 7:
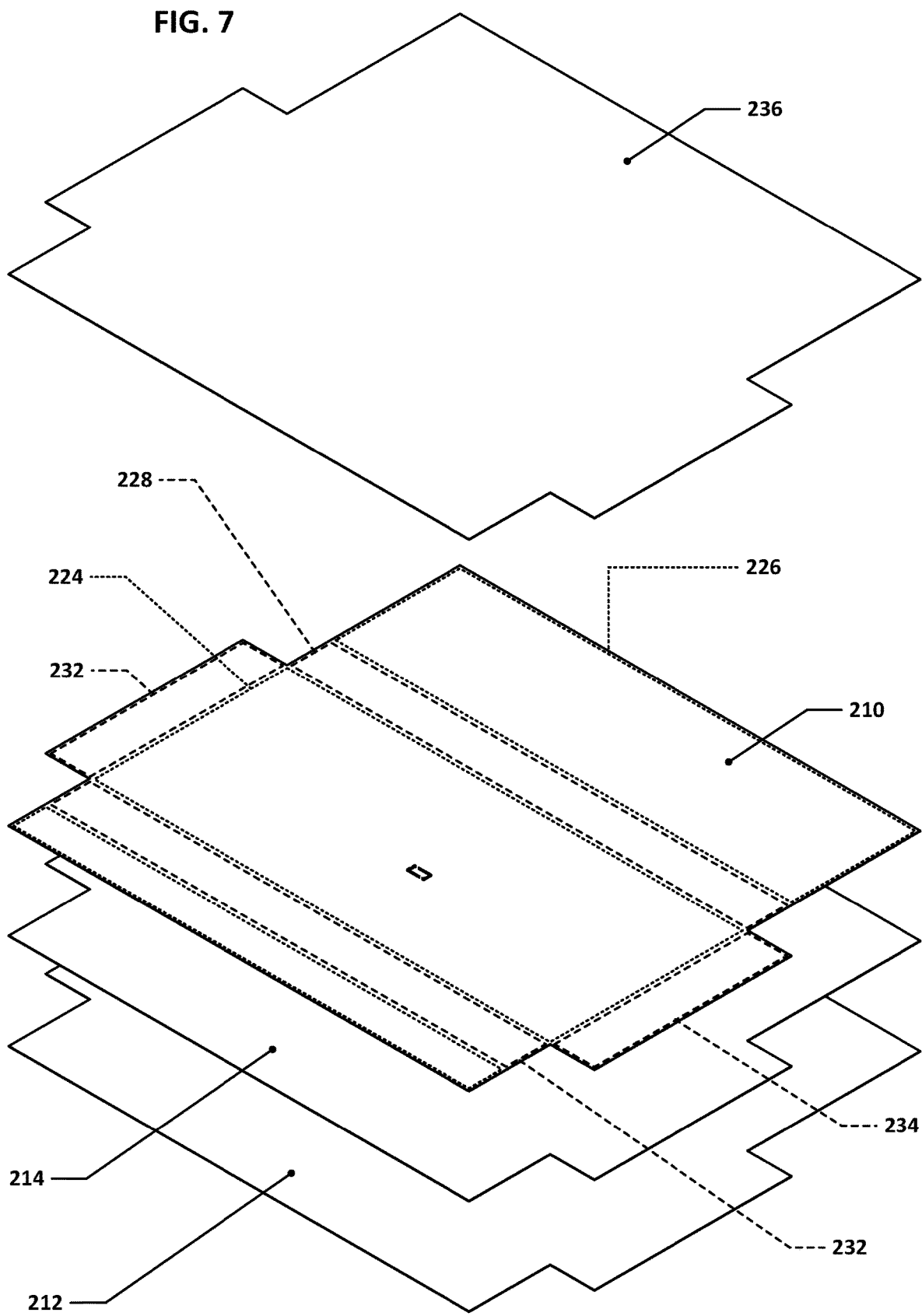
FIG. 7 depicts an exploded view of the display system of FIGS. 4 and 5, as well as other elements, in a "flattened" format.

The unified design of the display system 210 is shown more clearly in FIG. 7, which depicts the display system 210 of FIGS. 4 and 5 in a "flattened" format, e.g., what the display system 210 would look like if unfolded and flattened. In addition to the display system 210, additional layers/structures are also shown in an exploded format, including an optional touch-sensing system 236, e.g., a mutual or self-capacitance touch sensing system, an ultrasonic sensor substrate 214, and a piezoelectric layer 212. The touch-sensing system 236 may, for example, be any suitable sensor technology that may be used to detect touch inputs by a user to the display system 210. The touch-sensing system 236 may, for example, be provided on a flexible substrate that may be shaped so as to conform to the same overall shape as the display system 210 (when mounted to the housing 202). The touch-sensing system 236 may overlay the display system 210 and may, in some implementations, be part of the display system 210.

The ultrasonic sensor substrate 214 may, for example, be provided by a flexible substrate that has one or more arrays of ultrasonic sensor pixels located thereupon. Each ultrasonic sensor pixel may, for example, be in electrically conductive contact with the piezoelectric layer 212, which may also be flexible, such that thin-film transistors that may be included in the ultrasonic sensor pixels are able to register localized changes in voltage that may occur within the piezoelectric layer 212 due to the passage of an ultrasonic wave through portions of the piezoelectric layer 212.

Figure 8:
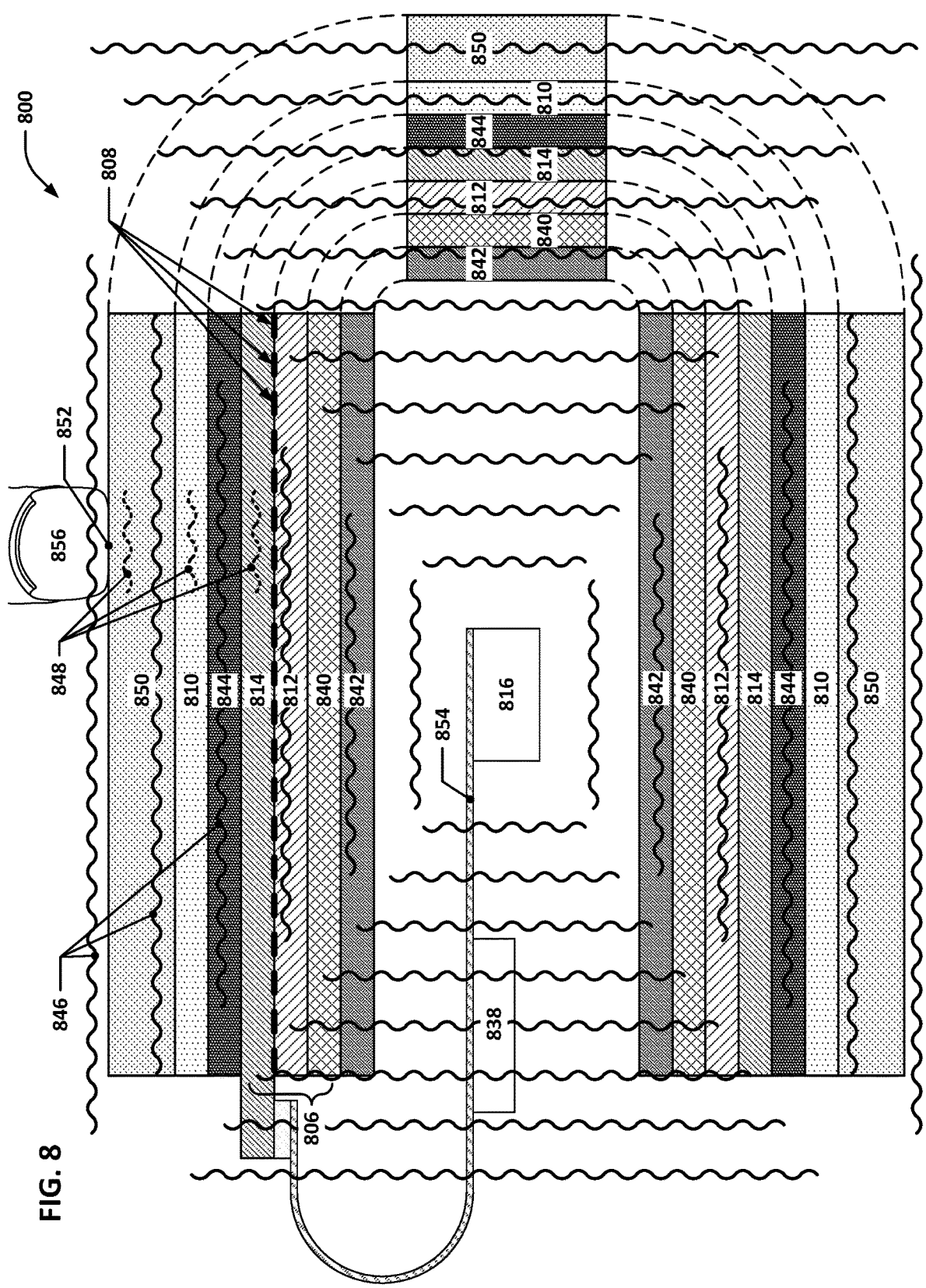
FIG. 8 shows example components of an apparatus according to some disclosed implementations.

FIG. 8 shows example components of an apparatus according to some disclosed implementations. As with other disclosed implementations, the types, number and arrangement of elements, as well as the dimensions of elements, are merely examples. According to this example, the apparatus 800 is configured to perform at least some of the methods disclosed herein. According to this implementation, the ultrasonic fingerprint sensor system 806 is an ultrasonic sensor system that includes a piezoelectric layer 812, an electrode layer 840 on one side of the piezoelectric layer 812 and an array of ultrasonic sensor pixels 808 on a second and opposing side of the piezoelectric layer 812. In this implementation, the piezoelectric layer 812 is an ultrasonic receiver layer that includes one or more piezoelectric polymers.

The ultrasonic fingerprint sensor system 806 also includes an ultrasonic transmitter 816 that is connected with a control system 838 by way of an electrical interconnect interface 854. The ultrasonic transmitter 816 is made of a piezoelectric material but is not in the form of a layer of piezoelectric material like the piezoelectric layer 812 that is coextensive with the piezoelectric layer 812. Rather, the ultrasonic transmitter 816 has the form of a volumetric solid, e.g., a rectangular solid, a cylindrical solid, etc. The control system 838 may be configured to controllably cause the ultrasonic transmitter 816 to generate ultrasonic waves 846 responsive to receipt of one or more control signals. However, it will be understood that the ultrasonic transmitter 816 may, in some implementations, be as little as 20 μm thick.

In this example, the various layers shown are all formed on flexible materials and are flexed into a U-shaped form, e.g., wrapped around three sides of a housing of a device. The curved, flexed portions of the layers are represented by dashed lines. In some implementations, the curved, flexed portions may also have similar features and elements as in the flat, planar portions shown, although in other implementations, they may be lacking one or more such features and/or elements and may instead simply feature, if warranted, electrical traces that may allow the various regions with electrical component features to communicate with other regions of the layers.

According to this example, the electrode layer 840 resides between a passivation layer 842 and the piezoelectric layer 812. In some examples, the passivation layer 842 may include an adhesive, such as an epoxy film, a polymer layer (such as a polyethylene terephthalate (PET) layer), etc.

In this example, an ultrasonic sensor substrate 814 is provided that is a thin-film transistor (TFT) layer; the thin film transistor layer may include a plurality of sensor circuits that form a plurality of ultrasonic sensor pixels 808 that are each able to detect localized electrical potentials generated within the piezoelectric layer 812 responsive to receipt of an ultrasonic wave within the piezoelectric layer 812 at the corresponding ultrasonic sensor pixel location. The ultrasonic sensor pixels 808 may, for example, be arranged in a rectangular array, a plurality of rectangular arrays, or in other patterns. The ultrasonic sensor substrate 814/TFT layer may include one or more types of metal-oxide-semiconductor field-effect transistors (MOSFETs) made by depositing thin films of an active semiconductor layer as well as a dielectric layer and metallic contacts over a TFT substrate. In some examples, the TFT substrate may be a non-conductive material such as glass, although if the ultrasonic fingerprint sensor system 806 is, as in this example, designed to be flexed, for example, into a non-planar configuration, then the TFT substrate may instead be a flexible material, e.g., a polymeric material.

In this example, the apparatus 800 includes a display system 810 which includes an OLED display in this instance. Here, the OLED display is attached to the ultrasonic sensor substrate 814/TFT layer via an adhesive layer 844. As with the ultrasonic fingerprint sensor system 806, the display system 810 may be provided on a rigid substrate, e.g., glass, in some implementations, but may, in other implementations (and implementations such as that shown) be provided on a flexible substrate, e.g., a polymeric substrate. For example, the display system 810 may be provided using one or more POLED displays (plastic OLED displays). A cover 850, e.g., a cover glass or polymeric material, may be provided to protect the display system 810 and other internal components from exposure to dust, moisture, or physical contact by objects, such as fingers. The cover 850 may also optionally incorporate a touch-sensing system, e.g., a mutual or self-capacitance touch-sensing system, that may be used to provide input to the underlying display system 810 (in other implementations, a touch-sensing system may be provided as part of the display system 810).

According to this implementation, the ultrasonic sensor substrate 814/TFT layer, the array of ultrasonic sensor pixels 808 and the electrode are electrically coupled to at least a portion of the control system 838 and one side of the ultrasonic layer 812/ultrasonic receiver layer via a portion of an electrical interconnect interface 854, which includes electrically conducting material and a flexible printed circuit (FPC) in this instance.

In this example, the apparatus 800 is configured to perform at least some of the methods disclosed herein. In this example and as mentioned above, the control system 838 is configured to control the ultrasonic sensor system to cause the ultrasonic transmitter 816 to transmit one or more ultrasonic waves 846. According to this example, the ultrasonic wave(s) 846 are transmitted through the TFT layer 814, the display system 810, and the cover 850. According to this example, ultrasonic wave reflections 848 of the ultrasonic wave(s) 846 are caused by acoustic impedance contrast at (or near) the interface 852 between the outer surface of the cover 850 and whatever is in contact with the outer surface, which may be air or the surface of a target object 856, such as the ridges and valleys of a fingerprint (in this example, the target object is a fingertip, as shown), etc. (As noted earlier, the term "finger" may refer to any digit, including a thumb; accordingly, a thumbprint will be considered a type of "fingerprint").

In some such examples, the ultrasonic wave reflections 848 may be detected by the ultrasonic sensor pixels 808 positioned beneath the target object 856 when such reflected waves pass through the adjacent piezoelectric layer 812 and generate a localized electrical potential within the piezoelectric layer 812 at the location of each ultrasonic sensor pixel 808 beneath the target object 856. Electrical signals corresponding to the detected ultrasonic signals may be provided by the ultrasonic fingerprint sensor system to the control system 838. In some such implementations, ultrasonic wave reflections 848 corresponding to a cover/air interface may also be detected by the electrode layer 840 and corresponding electrical signals produced by background reflected ultrasonic signals may also be provided to the control system 838. In some such implementations, electrical signals corresponding with received ultrasonic signals that are used by the control system 838 for fingerprint-based authentication may be based on ultrasonic wave reflections 848 from a cover/finger interface that are detected by the array of ultrasonic sensor pixels 808.

It will be understood that the ultrasonic sensor pixels 808 may generate signals indicating detection an ultrasonic wave when the ultrasonic wave 846 passes therethrough as well as when the reflected ultrasonic wave, if present, passes therethrough again. The control system 838 may, for example, be configured to discriminate between the two types of detection events by, for example, implementing a range gate delay or other time-based discrimination technique. For example, the control system 838 may cause the ultrasonic transmitter to emit an ultrasonic wave at a first time and may then wait a first period of time before reading data from the ultrasonic sensor pixels 808. The first period of time may be selected to be long enough that the ultrasonic waves 846 will have already passed through the piezoelectric layer 812 before the controller reads data from the ultrasonic sensor pixels 808 but short enough that the control system 838's reading of data from the ultrasonic sensor pixels 808 will capture data arising from the returning ultrasonic wave reflections 848. Alternatively, the control system 838 may simply read data from the ultrasonic sensor pixels 808 continuously after causing the ultrasonic transmitter 816 to generate the ultrasonic wave 846 and post-processing by the control system 838 or other system or components may be used to discriminate between the ultrasonic detection events arising from the ultrasonic wave 846 passing through the piezoelectric layer 812 (which will be the first such detection event generated after the ultrasonic wave 846 is generated) and the subsequent ultrasonic detection events arising from the ultrasonic wave reflections 848 passing through the piezoelectric layer 812 again shortly after.

Figure 9:
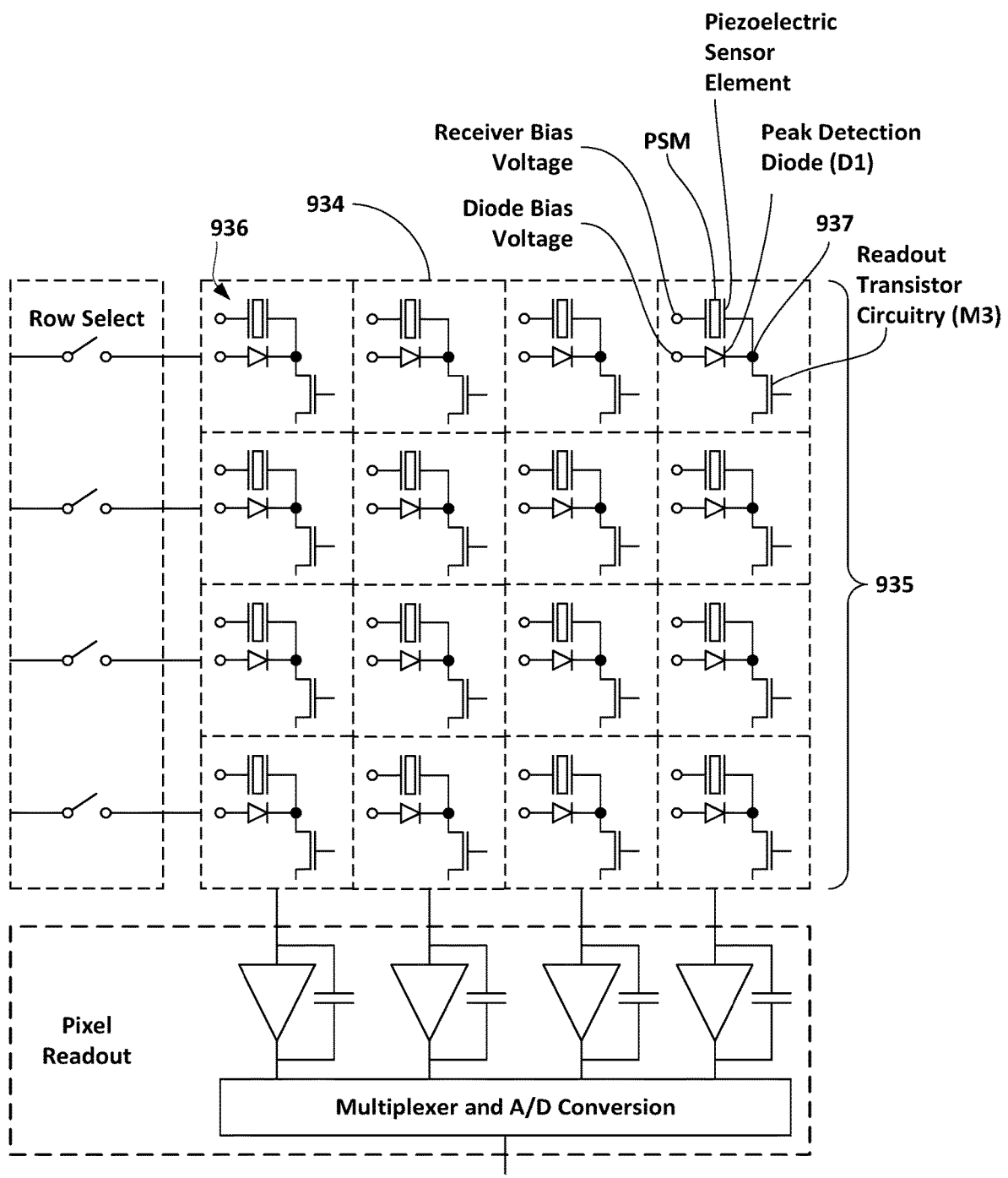
FIG. 9 representationally depicts aspects of a 4×4 pixel array of sensor pixels for an ultrasonic sensor system.

FIG. 9 representationally depicts aspects of a 4×4 pixel array 935 of ultrasonic sensor pixels 908 for an ultrasonic sensor system. Each ultrasonic sensor pixel 908 may be, for example, associated with a local region of piezoelectric sensor material (PSM), a peak detection diode (D1) and a readout transistor; many or all of these elements may be formed on or in a substrate to form the pixel circuit 936. In practice, the local region of piezoelectric sensor material of each ultrasonic sensor pixel 908 may transduce received ultrasonic energy into electrical charges. The peak detection diode D1 of each ultrasonic sensor pixel 908 may register the maximum amount of charge detected by the local region of piezoelectric sensor material for that ultrasonic sensor pixel 908. Each row of the pixel array 935 may then be scanned, e.g., through a row select mechanism, a gate driver, or a shift register, and the readout transistor for each column may be triggered to allow the magnitude of the peak charge for each ultrasonic sensor pixel 908 to be read by additional circuitry, e.g., a multiplexer and an A/D converter. The pixel circuit 936 may include one or more TFTs to allow gating, addressing, and resetting of the ultrasonic sensor pixel 908.

Each pixel circuit 936 may provide information about a small portion of the object detected by the ultrasonic sensor system. While, for convenience of illustration, the example shown in FIG. 9 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object. For example, in some implementations, such as some of the various implementations discussed herein in which a device may have a plurality of sides that not only include display capability but also ultrasonic fingerprint detection capability, the detection area of the ultrasonic fingerprint sensor system may be as large as the active display area of the device's display system or, as noted later below, even larger.

Devices having ultrasonic fingerprint sensors systems that allow for multiple fingerprints to be obtained simultaneously or near-simultaneously from multiple non-coplanar surfaces thereof and/or that allow for fingerprints to be obtained from any of multiple non-coplanar surfaces thereof may be configured to provide particular functionality that cannot be provided with fingerprint sensor systems that do not feature such capabilities.

Figure 10:
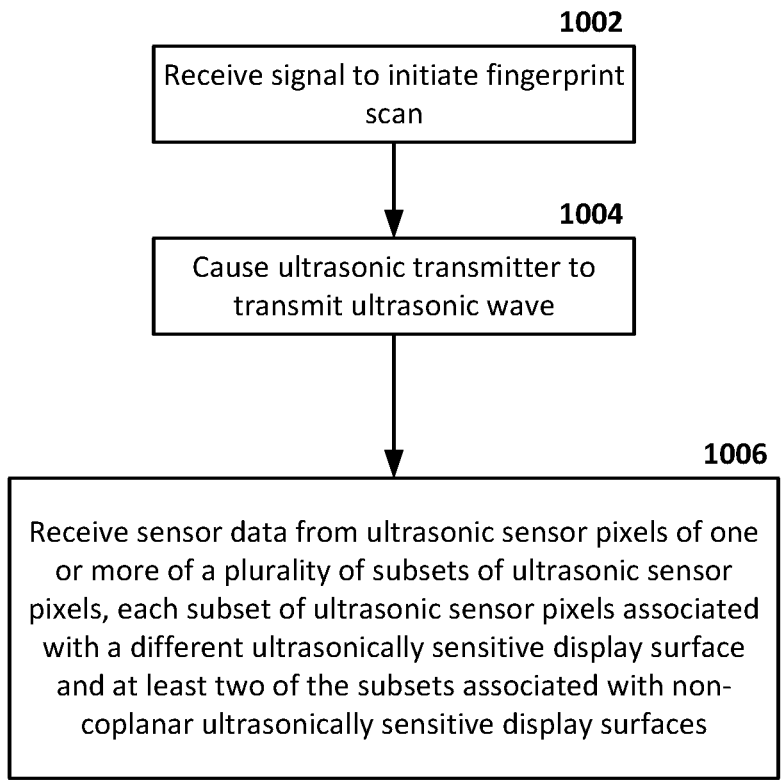
FIG. 10 depicts a flow diagram of one technique of obtaining a fingerprint scan using implementations described herein.

FIG. 10 depicts a flow diagram of one technique of obtaining a fingerprint scan using implementations described herein. The technique of FIG. 10 may begin in block 1002, in which a control system of a device featuring an ultrasonic fingerprint sensor system having the capability to obtain fingerprints from multiple non-coplanar surfaces, such as one of the devices described herein, may receive a signal to initiate a fingerprint scan. Such a signal may, for example, arise from program code or software that is executed by the control system and/or by a processor of the device that is in communication with the control system. In some implementations, the signal to initiate a fingerprint scan may also include information that identifies one or more sides or one or more regions on one or more sides of the device for which fingerprint detection is to be performed.

In block 1004, the control system may cause an ultrasonic transmitter of the device to transmit an ultrasonic wave. The ultrasonic transmitter, as discussed above, may be a component that is discrete from the ultrasonic sensor substrate(s) of the device and the piezoelectric layer(s) that may be used by the ultrasonic fingerprint sensor system as an ultrasonic receiver. The ultrasonic wave may propagate outward from the ultrasonic transmitter in a generally omnidirectional manner (or, at least, in a non-planar manner) such that it passes through ultrasonic sensor pixels associated with each non-coplanar surface mentioned above. When the ultrasonic wave reaches the outermost surfaces of the device, the ultrasonic wave will be reflected back towards the sensor pixels of the ultrasonic fingerprint sensor system to varying degrees depending on what is contacting the device at various locations.

The reflection of ultrasonic waves that pass through transitions between different materials may operate according to a reflection ratio, e.g., the ratio of the amplitude of the reflected wave to the amplitude of the source wave that passes through the material transition. The reflection ratio is a function of the acoustic impedances of the materials at the material transition. In the case of an ultrasonic fingerprint sensor system, the reflection ratio for transitions between the device and empty air may be much larger than for transitions between the device and, for example, the epidermis of a fingertip. Thus, for example, the ridges in a fingerprint of a finger that is touching the device at a particular location may generally reflect less of the ultrasonic wave than the valleys in the fingerprint which may, in effect, act as tunnels that contain small air-gap passages that cause more of the ultrasonic wave to be reflected back in those locations.

In block 1006, the control system may cause sensor data to be read from the ultrasonic sensor pixels of one or more of a plurality of subsets of ultrasonic sensor pixels of the ultrasonic fingerprint sensor system immediately after or while the ultrasonic wave is being emitted in block 1004. Each subset of ultrasonic sensor pixels may be associated with a different ultrasonically sensitive display surface, and at least two of the subsets may be associated with non-coplanar ultrasonically sensitive display surfaces.

For example, as noted earlier, the control system cause each row of a pixel array to be scanned, e.g., through a row select mechanism, a gate driver, or a shift register, and the readout transistors for each column to be triggered to allow the magnitude of the peak charge for each pixel to be read by additional circuitry, e.g., a multiplexer and an A/D converter. In some implementations, there may be multiple pixel arrays, e.g., in the example of FIG. 7, the ultrasonic sensor substrate 714/TFT layer of the ultrasonic fingerprint sensor system may have multiple pixel arrays that each correspond in extent and location to a different one of the dotted-line regions of the display system layer 710. In such implementations, the control system may perform multiple scan operations, one for each such pixel array, either sequentially or in parallel.

In some implementations, the control system may only selectively scan some of the sensor pixels of the ultrasonic fingerprint sensor system in block 1006. For example, if the signal to initiate a fingerprint scan also included information that identified one or more sides or one or more regions on one or more sides of the device for which fingerprint detection is to be performed, the control system may optionally cause only the sensor pixels of the ultrasonic fingerprint sensor system corresponding with those sides or regions of the device to be read or scanned produce a fingerprint scan. Such implementations may provide power savings for the device, as the power consumption associated with reading or scanning the other sensor pixels not on those sides or not in those regions may be conserved. In other implementations, all of the sensor pixels of the ultrasonic fingerprint sensor system may be caused by the control system to be scanned or read, but the resulting data that is output may be caused by the control system to be limited to only the data from the sensor pixels located on the side(s) or region(s) of the device indicated by the information included in the signal to initiate the fingerprint scan. In either case, the resulting dataset may be smaller than the maximum dataset able to be produced by the ultrasonic fingerprint sensor system, thereby requiring less processing overhead by the control system (or other system) that post-processes the acquired fingerprint scan(s) in order to detect and locate a portion or portions thereof that correspond to actual fingerprints.

Such implementations may, for example, be used in a variety of contexts. For example, in some implementations, the device may be a device like a smartphone or tablet that has the ability to prevent access by a user to the device's software and/or operating system unless the user authenticates themselves to the device, e.g., by way of one or more fingerprints, for example. Generally speaking, current devices featuring fingerprint authentication feature only a limited area of one side of the device that is equipped with fingerprint scanning capability, and the user is forced to place their fingertip on that specific location in order to authenticate themselves to the device. In contrast, the ultrasonic fingerprint sensor systems discussed herein allow for fingerprint scanning capability to be provided across large areas of a device, including on multiple non-coplanar surfaces thereof. This allows for users to potentially be authenticated, in some instances, merely by picking up the device.

For example, a device such as the apparatus 200 discussed earlier may be configured to detect when a user has picked up or touched the device while the device is in an access-controlled state. For example, the device may include an accelerometer that may detect when the device is being moved (such as when a user picks it up) or a touch-sensing system that may detect when the device is being touched by a user's skin. The control system may, for example, monitor the accelerometer data or the touch-sensing system data for potential indications of the device being moved and/or the device being touched by a person, and, responsive thereto, cause the ultrasonic fingerprint sensing system to activate in order to obtain one or more fingerprint scans from surfaces of the device. For example, the control system may cause the entire area (including portions of the area on multiple non-coplanar sides of the device) of the ultrasonic fingerprint sensing system to be scanned for potential fingerprints. If any fingerprints are detected anywhere in the scanned area, those fingerprints may be compared against enrolled fingerprints of authorized users. If the detected fingerprint(s) suitably match any of the enrolled fingerprints, then the control system may determine that the user is an authorized user and provide a level of access to the user commensurate with their authorization level.

Figure 11:
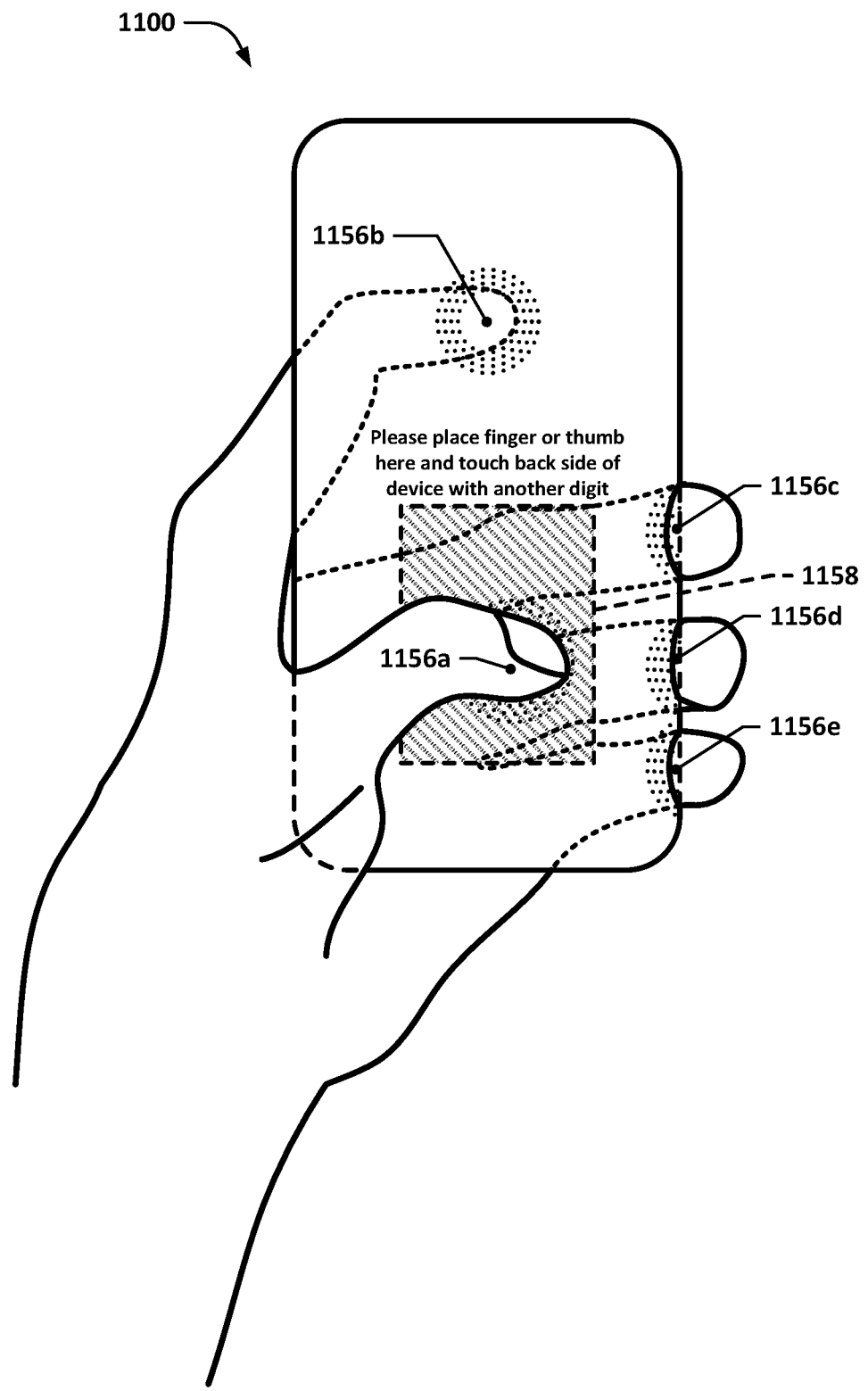
FIG. 11 depicts an example of an implementation as disclosed herein demonstrating multiple-surface fingerprint detection.

In some other implementations, a device such as the apparatus 200 may be configured to present authentication interfaces to a user that require the user to touch particular areas or sides of the device with their fingers or thumbs. Such implementations may be configured to require that multiple fingerprints be provided to multiple, non-coplanar surfaces of the devices in question in order to make it even more difficult for non-authorized users to gain access to the device. FIG. 11 depicts an example of such an implementation. In FIG. 11, an apparatus 1100 (a smartphone, in this example) is shown grasped in a user's left hand with the left edge of the apparatus 1100 wedged against the heel of the user's left thumb and the right edge of the apparatus 1100 gripped by the middle, ring, and pinky fingers of the user's left hand. The index finger of the user's left hand is behind the apparatus 1100 and touching the rear surface thereof to provide additional support, while the thumb of the user's left hand is being used by the user to interact with touchscreen controls displayed on a display visible on the device's front side (the boundaries of the display are not shown in this view). Portions of the user's left hand and the apparatus 1100 that are occluded by the apparatus 1100 or the user's left hand, respectively, are shown in dashed or dotted lines. Dotted concentric circles or arcs indicate locations of fingertip contact with ultrasonically sensitive display surfaces of the apparatus 1100.

Visible in FIG. 11 is a GUI that includes a target region 1158 that has been designated by software executed by the control system of the apparatus 1100 as a fingerprint recognition area. The GUI includes a text prompt instructing the user to place one digit within the target region 1158 and to place another digit against the back side of the device. The apparatus 1100 may then cause two regions of the ultrasonic fingerprint sensor system of the apparatus 1100 to be scanned for fingerprints—the target region 1158 on the front side of the apparatus 1100 and a region that is coextensive with the entire back surface of the apparatus 1100. In this example, a fingerprint scan performed across such regions will result in a fingerprint scan of the person's left thumb and index finger.

If the scanned fingerprints suitably match enrolled fingerprints for that user, then the apparatus 1100 may, for example, be caused by the control system to perform one or more actions requiring user authentication, e.g., such as making a purchase via an app executing on the apparatus 1100, engaging in a financial transaction involving the transfer of money from one account to another or from an account to an individual, allowing the user to access data stored on the device on a remote server (such as email, photos, files, etc.), accessing user profile information, accessing device settings (particularly those involving biometric authentication (including fingerprints, iris images, voiceprints, etc.), screen lock settings, and/or passwords, personal identification numbers or codes, etc.). Should the scanned fingerprints not suitably match the enrolled fingerprints for that user, then the control system may cause access to such information to not be permitted in response to that authentication attempt (although such access may be granted in response to a subsequent, successful fingerprint match in some implementations).

It will be appreciated that systems or apparatuses requiring that multiple fingerprint scans from multiple, non-coplanar surfaces of an apparatus be provided in order to authenticate a user may offer an increased level of biometric security as compared with apparatuses that only scan fingerprints from a single surface or coplanar surfaces. For example, a bad actor may find it relatively easy to place a user's finger onto a fingerprint sensor in order to authenticate the user to the apparatus having the fingerprint sensor, e.g., if the user is asleep or otherwise unconscious, it may be very easy to simply place the user's finger on the fingerprint sensor of such an apparatus. However, if the bad actor must also, at the same time, cause other digits of the user to simultaneously contact another surface or surfaces of the apparatus while the first digit is touching a region on a first surface of the apparatus, then this becomes much more challenging to accomplish (especially if the bad actor must also hold the apparatus in question at the same time). Such implementations may also make it more difficult for authorized users to accidentally authenticate a transaction when the user actually did not wish to do so.

Figure 12:
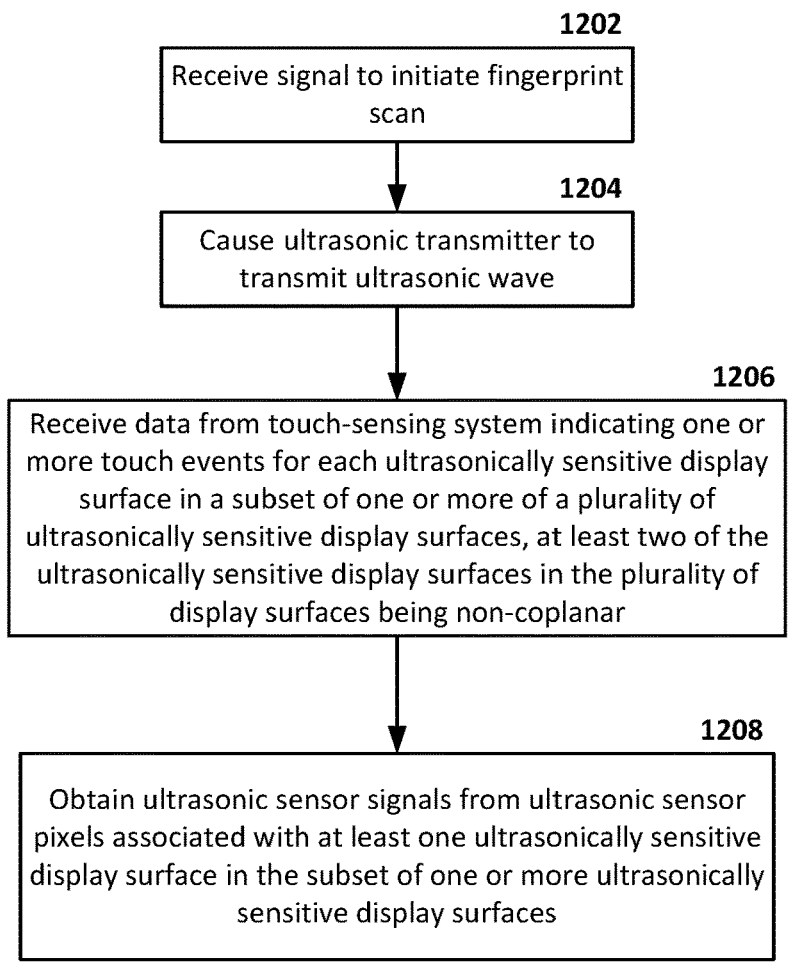
FIG. 12 depicts a flow diagram of another technique of obtaining a fingerprint scan using implementations described herein.

FIG. 12 depicts a flow diagram of another technique of obtaining a fingerprint scan using implementations described herein. The technique of FIG. 12 may begin in block 1202, in which a signal to initiate a fingerprint scan may be received by a control system connected with an ultrasonic fingerprint sensor system having the capability to obtain fingerprints from multiple non-coplanar surfaces, such as one of the devices described herein. As with the technique of FIG. 10, such a signal may, for example, arise from program code or software that is executed by the control system and/or by a processor of the device that is in communication with the control system. Also similar to the implementation of FIG. 10, in some implementations, the signal to initiate a fingerprint scan may also include information that identifies one or more sides or one or more regions on one or more sides of the device for which fingerprint detection is to be performed.

In block 1204, the control system may cause an ultrasonic transmitter of the device to transmit an ultrasonic wave. The ultrasonic transmitter, as discussed above, may be a component that is discrete from the ultrasonic sensor substrate(s) of the device and the piezoelectric layer(s) that may be used by the ultrasonic fingerprint sensor system as an ultrasonic receiver. The ultrasonic wave may propagate outward from the ultrasonic transmitter in a generally omnidirectional manner (or, at least, in a non-planar manner) such that it passes through ultrasonic sensor pixels associated with each non-coplanar surface mentioned above. When the ultrasonic wave reaches the outermost surfaces of the device, the ultrasonic wave will be reflected back towards the sensor pixels of the ultrasonic fingerprint sensor system to varying degrees depending on what is contacting the device at various locations, as discussed earlier.

In block 1206, the control system may additionally receive data from a touch-sensing system of the apparatus, e.g., a touch-screen sensor or other similar device, that may provide information on the locations of potential touch-inputs by a person. For example, the display system(s) of the apparatus may include a touch-screen sensor capability, e.g., a resistive touch-screen sensor, a surface capacitive touch-screen sensor, a projected capacitance touch-screen sensor, etc., that may allow the apparatus to detect the locations of potential touch inputs provided to the apparatus by a user. It is important to note that while ultrasonic fingerprint sensor systems are technically capable of performing touch-sensing, the touch-sensing systems discussed herein refer to sensor systems other than ultrasonic fingerprint sensor systems. For example, touch-sensing systems typically use sensor pixel spacing that is much coarser than that user for fingerprint sensing. In ultrasonic fingerprint sensor systems, the sensor pixel pitch may be on the order of 500 pixels/inch in order to obtain resolution adequate to image fingerprints with sufficient detail to be used for authentication purposes. In contrast, touch-sensing systems typically utilize much coarser sensor pixel pitches, e.g., on the order of less than 10 sensor pixels per inch, for example, as all that is needed is location information regarding one or more touch-input locations. Such input can, for example, be obtained through interpolation between sensor pixel locations, allowing the positional accuracy of touch input locations to be determined to a higher resolution than the resolution of the touch-sensing sensor pixels. As a result, the number of sensor pixels that must be scanned by a touch-sensing system to detect a touch input anywhere within the sensing area thereof is typically orders of magnitude less than would need to be scanned in an equivalently sized ultrasonic fingerprint sensor system in order to detect a touch input thereto. Accordingly, touch-sensing systems are able to operate to detect touch inputs with much lower power consumption, greater speed and responsiveness, and less processor overhead than can ultrasonic fingerprint sensor systems.

With regard to the technique of FIG. 12, the apparatus may have a plurality of ultrasonically sensitive display surfaces and may have a touch-sensing system that is configured to detect touch inputs provided to such ultrasonically sensitive display surfaces. The control system may be configured to identify a subset of one or more such ultrasonically sensitive display surfaces (or portions or regions thereof) that correspond with locations of touch inputs provided by the touch-sensing system (it will be understood that the subset may not necessarily be a proper subset, i.e., it may, in some cases, include all of the ultrasonically sensitive display surfaces).

It will be appreciated that, if desired, the operations of blocks 1204 and 1206 may be swapped in order, as the generation of the ultrasonic wave may be performed before, after, or while the touch-sensing system touch location data is received by the control system.

The control system may then, in block 1208, cause sensor data to be read from the ultrasonic sensor pixels associated with at least one of the ultrasonically sensitive display surfaces in the subset of one or more ultrasonically sensitive display surfaces immediately after or while the ultrasonic wave is being emitted in block 1204. For example, as noted earlier, the control system cause each row of a pixel array including the ultrasonic sensor pixels of interest to be scanned, e.g., through a row select mechanism, a gate driver, or a shift register, and the readout transistors for each column to be triggered to allow the magnitude of the peak charge for each pixel to be read by additional circuitry, e.g., a multiplexer and an A/D converter. In some implementations, the control system may identify the location or locations of one or more touch inputs and may then define an area around each such touch input location, e.g., an area sized to generally be large enough to include the fingerprint of the finger producing that touch input, e.g., 1 to 7 square centimeters. In some implementations, such areas may each be centered on their respective touch input locations and may be, for example, circular, square, or otherwise shaped so as to have a generally 1:1 aspect ratio, thereby increasing the chance that a scan of each such area using the ultrasonic fingerprint sensor system will obtain a corresponding fingerprint scan. Accordingly, in some such implementations, the control system may cause only the sensor pixels that are located within the above-discussed defined areas associated with each touch input location to be scanned for ultrasonic fingerprint data, thereby reducing the time, power, and computational overhead needed to perform a fingerprint scan. Alternatively, larger areas of the ultrasonic fingerprint sensor system may be scanned for ultrasonic fingerprint data, e.g., all of one or more ultrasonically sensitive display surfaces of the apparatus (such as the ultrasonically sensitive display surfaces that correspond with sides of the apparatus on which touch inputs are detected) may be scanned for ultrasonic fingerprint data, but only the data from the sensor pixels within the above-discussed defined areas may be analyzed for fingerprints, thereby reducing the computational overhead required to obtain fingerprint scans.

Such implementations may leverage the touch-sensing system to reduce the potential power consumption of the ultrasonic fingerprint sensor system and/or to reduce the amount of computational overhead and responsiveness associated with obtaining fingerprint scans from such an ultrasonic fingerprint sensor system.

Such a technique is illustrated further in FIGS. 13-A through 13C. FIGS. 13-A and 13-B depict an example apparatus, e.g. the apparatus 200 discussed earlier, being held in a user's hand, e.g., similar to the apparatus 1100 of FIG. 11. As can be seen in FIG. 13-A, all five of the user's digits on the left hand are making contact at their respective fingertips with the apparatus 200 at locations 1356a-e. FIG. 13-B depicts touch event locations 1360a and 1360b, which correspond to touch events resulting from the contacts between the thumb and index finger and the apparatus 200. Similar touch-input locations may also exist for the other three fingers depicted, although such locations are not visit in FIG. 13-B due to the view orientation.

Also shown in FIG. 13-B are scan areas 1362a and 1362b, which are, in this example, square regions that are sized large enough, e.g., 1 to 2 cm on a side, as to be able to obtain ultrasonic fingerprint data on the fingertips of the index finger and the thumb.

FIG. 13-C shows the display system 210 and the associated ultrasonic fingerprint sensor system 206 (which may, for example, include the piezoelectric layer 212, the ultrasonic sensor substrate 214, and the ultrasonic transmitter 216 discussed earlier) in an unfolded, isometric view. As can be seen, in addition to the touch event locations 1360a and 1360b, the contacts of the middle, ring, and pinky fingers with the apparatus 200 also resulted in touch event locations 1360c, 1360d, and 1360e. Also shown in FIG. 13-C are scan areas 1362c, 1362d, and 1362e, each of which is centered on a different one of the touch event locations 1360c, 1360d, and 1360e.

In such an implementation, the control system of the apparatus 200 may determine the touch event locations 1360a-1360e and then identify scan areas 1362a-1362e around each such touch event location. The control system may then cause the ultrasonic fingerprint sensor system 206 to generate ultrasonic fingerprint data for fingerprints within only each scan area 1362a-1362e.

In some such implementations, such an apparatus may be configured to seek fingerprint authentication from one or multiple fingers simultaneously, e.g., one, two, three, four, five, six, seven, eight, nine, or even all ten of a user's fingers and thumbs. For example, the control system may cause a prompt to be displayed to the user to place all ten finger/thumbtips on the ultrasonically sensitive display surfaces of the apparatus so that the apparatus may scan all of the user's fingerprints in order to authenticate an action.

It will be appreciated that the apparatuses and systems discussed herein may be configured to perform time-based multiplexing in order to more clearly identify ultrasonic fingerprint signals. For example, in some implementations, the control system may cause the ultrasonic transmitter to generate an ultrasonic wave and may then cause sensor data from sensor pixels associated with a first ultrasonically sensitive display surface of the apparatus to be obtained/read out. The ultrasonic transmitter may then be caused to generate another ultrasonic wave before causing the sensor data from sensor pixels associated with a second ultrasonically sensitive display surface to be obtained/read out. This process may continue as needed until ultrasonic fingerprint scans have been taken from all desired ultrasonically sensitive display surfaces. In some implementations, such a technique may be practiced for a plurality of ultrasonically sensitive display surfaces that all simultaneously are indicated as experiencing touch events (e.g., via a touch-sensing system), with fingerprint scans/ultrasonic sensor signals from each of the ultrasonically sensitive surfaces being obtained in a rapid, sequential fashion, e.g., within the span of a few milliseconds per scan. To the user, such a multi-surface sequential fingerprint scan may appear near-instantaneous even if, for example, fingerprint scans of six different sides of an apparatus are obtained.

It will be appreciated that while the discussion above has focused on the use of piezoelectric materials for the ultrasonic transmitter, e.g., the ultrasonic transmitter 216, other implementations may use other types of materials capable of generating an ultrasonic wave. For example, in some implementations, the ultrasonic transmitter may be made of a photoacoustic material, e.g., a material that emits ultrasonic waves when subjected to stimulation from a light source (as opposed to having an electrical potential applied thereacross). In such an example, the piezoelectric material used for the ultrasonic transmitter may be replaced with a photoacoustic material that may be caused to generate ultrasonic waves responsive to photonic input received from one or more light sources, e.g., as may be caused to be activated by the control system.

It will be further appreciated that while this disclosure has primarily focused on the use of the disclosed ultrasonic fingerprint sensor systems in conjunction with ultrasonically sensitive display surfaces of a display system, other implementations may use the ultrasonic fingerprint sensor systems disclosed herein in non-display contexts. For example, the disclosed ultrasonic fingerprint sensor systems may also include one or more subsets of ultrasonic sensor pixels that are proximate to corresponding non-display surfaces, e.g., a surface of a housing that does not have a display capability. In the extreme case, all of the ultrasonic sensor pixels of an ultrasonic fingerprint sensing system may be proximate to non-display surfaces (for example, the apparatus incorporating the ultrasonic fingerprint sensing system may not even have a display at all and each subset of ultrasonic sensor pixels may simply be proximate to a different a surface of the apparatus housing). In recognition of this aspect of the disclosed ultrasonic fingerprint sensor systems, it will be understood that the discussion above relating to ultrasonically sensitive display surfaces may also be generically applicable to simply "ultrasonically sensitive surfaces," which are to be understood to refer to surfaces of a device or apparatus (which may or may not have display capability) that have an ultrasonic fingerprint sensing capability by virtue of subsets of ultrasonic sensor pixels that are proximate to such ultrasonically sensitive surfaces.

Devices that incorporate ultrasonic fingerprint sensor systems such as those discussed above may, for example, be able to ultrasonically scan fingerprints from fingers that are in contact with the device housing and/or surfaces of the device that are used to display graphical content.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items. Similarly, the term "set" or "subset" should not be viewed, in itself, as necessarily encompassing a plurality of items—it will be understood that a set or a subset can encompass only one member or multiple members (unless the context indicates otherwise).

Terms such as "about," "approximately," "substantially," "nominal," or the like, when used in reference to quantities or similar quantifiable properties, are to be understood to be inclusive of values within ±10% of the values or relationship specified (as well as inclusive of the actual values or relationship specified), unless otherwise indicated.

The use of "between," unless otherwise indicated, is to be understood to be inclusive of the values indicated. Thus, for example, "between A and B" is to be understood to be inclusive of not only the values less than B and greater than A (or vice versa, depending on the order of A and B) but also the values A and B.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

It will be understood that in addition to the various implementations that are evident from the Figures and the above discussion, this disclosure is, at the least, also directed to at least the implementations listed in the following numbered clauses.

Clause 1: An apparatus comprising:
an ultrasonic fingerprint sensor system including a plurality of ultrasonic sensor pixels, each ultrasonic sensor pixel configured to generate a corresponding ultrasonic sensor signal responsive to that ultrasonic sensor pixel detecting passage of an ultrasonic wave therethrough;
a display system including at least one display, the display system including a plurality of ultrasonically sensitive display surfaces, each ultrasonically sensitive display surface associated with a different subset of display pixels of the display system and a different subset of the ultrasonic sensor pixels, wherein at least two of the ultrasonically sensitive display surfaces are not coplanar with each other; and
an ultrasonic transmitter that is not coextensive with the ultrasonically sensitive display surfaces, the ultrasonic transmitter configured to transmit one or more ultrasonic waves responsive to receipt of one or more input signals.

Clause 2: The apparatus of clause 1, wherein the ultrasonic transmitter is configured to emit one or more ultrasonic waves that pass through all of the ultrasonically sensitive display surfaces.

Clause 3: The apparatus of either clause 1 or clause 2, wherein the ultrasonic transmitter is the only ultrasonic transmitter in the apparatus configured to be used to provide ultrasonic waves for detection by the ultrasonically sensitive display surfaces.

Clause 4: The apparatus of any one of clauses 1 through 3, further comprising a housing, wherein:
the housing has a front side and a rear side facing in an opposite direction from the front side, and
a first ultrasonically sensitive display surface of the ultrasonically sensitive display surfaces is on the front side of the housing and a second ultrasonically sensitive display surface of the ultrasonically sensitive display surfaces is on the rear side of the housing.

Clause 5: The apparatus of clause 4, wherein:
the housing has an edge side spanning between the front side and the rear side, and
a third ultrasonically sensitive display surface of the ultrasonically sensitive display surfaces is on the edge side.

Clause 6: The apparatus of any one of clauses 1 through 5, wherein the ultrasonic transmitter is not in the form of a thin sheet.

Clause 7: The apparatus of any one of clauses 1 through 6, wherein the ultrasonic transmitter has a prismatic or cylindrical solid shape.

Clause 8: The apparatus of any one of clauses 4 through 7, wherein:
the ultrasonic transmitter has a shape that is substantially proportional to a shape of the housing, and
the ultrasonic transmitter is substantially centered within the housing.

Clause 9: The apparatus of any one of clauses 4 through 8, further comprising:
a touch-sensing system configured to independently detect when one or more of the ultrasonically sensitive display surfaces experiences a touch event, and
a controller configured to:
a) receive touch data from the touch-sensing system indicating one or more touch events for a subset of one or more of the ultrasonically sensitive display surfaces,
b) cause, responsive to (a), the ultrasonic transmitter to transmit one or more ultrasonic waves, and
c) obtain, responsive to (a), ultrasonic sensor signals from the ultrasonic sensor pixels associated with at least one ultrasonically sensitive display surface in the subset of one or more ultrasonically sensitive display surfaces.

Clause 10: The apparatus of clause 9, wherein the controller is further configured to obtain fingerprint data based, at least in part, on the ultrasonic sensor signals.

Clause 11: The apparatus of clause 10, wherein the fingerprint data is for between 1 and 10 fingers.

Clause 12: The apparatus of clause 10, wherein the controller is further configured to perform an authentication process using the fingerprint data.

Clause 13: The apparatus of clause 9, wherein the controller is further configured to:
d) detect when the touch data received from the touch-sensing system indicates that a first ultrasonically sensitive display surface and a second ultrasonically sensitive display surface of the plurality of ultrasonically sensitive display surfaces are both experiencing simultaneous touch events, and
e) obtain, responsive to detecting that the touch data received from the touch-sensing system indicates that the first ultrasonically sensitive display surface and the second ultrasonically sensitive display surface of the plurality of ultrasonically sensitive display surfaces are both experiencing simultaneous touch events, first ultrasonic sensor signals from the first ultrasonically sensitive display surface and second ultrasonic sensor signals from the second ultrasonically sensitive display surface.

Clause 14: The apparatus of clause 13, wherein the controller is further configured to obtain the first ultrasonic sensor signals from the first ultrasonically sensitive display surface for one or more time periods that are different from one or more time periods for which the second ultrasonic sensor signals are obtained.

Clause 15: The apparatus of either clause 13 or clause 14, wherein the controller is further configured to:
  obtain first fingerprint data based, at least in part, on the first ultrasonic sensor signals, and
  obtain second fingerprint data based, at least in part, on the second ultrasonic sensor signals.

Clause 16: The apparatus of clause 15, wherein the controller is further configured to perform an authentication process using the first fingerprint data and the second fingerprint data.

Clause 17: A method comprising:
  generating a non-planar ultrasonic wave responsive to receipt of one or more input signals and using an ultrasonic transmitter located within a housing of an apparatus having a) a display system with at least one display and a plurality of ultrasonically sensitive display surfaces, at least two of which are non-coplanar and each of which is associated with a different plurality of display pixels, and b) a plurality of ultrasonic sensor pixels, wherein each ultrasonic sensor pixel is associated with a different one of the ultrasonically sensitive display surfaces and the ultrasonic transmitter is not coextensive with the ultrasonically sensitive display surfaces; and
  obtaining ultrasonic sensor signals from a subset of the ultrasonic sensor pixels associated with at least one of the ultrasonically sensitive display surfaces.

Clause 18: The method of clause 17, further comprising causing the non-planar ultrasonic wave to pass through all of the ultrasonically sensitive display surfaces.

Clause 19: The method of either of clauses 17 or 18, wherein:
  the housing has a front side and a rear side facing in an opposite direction from the front side, and
  a first ultrasonically sensitive display surface of the ultrasonically sensitive display surfaces is on the front side of the housing and a second ultrasonically sensitive display surface of the ultrasonically sensitive display surfaces is on the rear side of the housing.

Clause 20: The method of clause 19, wherein:
  the housing has an edge side spanning between the front side and the rear side, and
  a third ultrasonically sensitive display surface of the ultrasonically sensitive display surfaces is on the edge side.

Clause 21: The method of any one of clauses 17 through 20, wherein the ultrasonic transmitter is not in the form of a thin sheet.

Clause 22: The method of any one of clauses 17 through 21, wherein the ultrasonic transmitter has a prismatic or cylindrical solid shape.

Clause 23: The method of any one of clauses 17 through 22, wherein:
  the ultrasonic transmitter has a shape that is substantially proportional to a shape of the housing, and
  the ultrasonic transmitter is substantially centered within the housing.

Clause 24: The method of any one of clauses 17 through 23, further comprising:
  a) receiving touch data from a touch-sensing system of the apparatus indicating one or more touch events for a subset of one or more of the ultrasonically sensitive display surfaces,
  b) causing, responsive to (a), the ultrasonic transmitter to transmit the non-planar ultrasonic wave, and
  c) obtaining, responsive to (a), ultrasonic sensor signals from the ultrasonic sensor pixels associated with at least one ultrasonically sensitive display surface in the subset of one or more ultrasonically sensitive display surfaces.

Clause 25: The method of clause 24, further comprising obtaining fingerprint data based, at least in part, on the ultrasonic sensor signals.

Clause 26: The method of clause 25, wherein the fingerprint data is for between 1 and 10 fingers.

Clause 27: The method of clause 25, further comprising performing an authentication process using the fingerprint data.

Clause 28: The method of clause 24, further comprising:
  d) detecting when the touch data received from the touch-sensing system indicates that a first ultrasonically sensitive display surface and a second ultrasonically sensitive display surface of the plurality of ultrasonically sensitive display surfaces are both experiencing simultaneous touch events, and
  e) obtaining, responsive to detecting that the touch data received from the touch-sensing system indicates that the first ultrasonically sensitive display surface and the second ultrasonically sensitive display surface of the plurality of ultrasonically sensitive display surfaces are both experiencing simultaneous touch events, first ultrasonic sensor signals from the first ultrasonically sensitive display surface and second ultrasonic sensor signals from the second ultrasonically sensitive display surface.

Clause 29: The method of clause 28, further comprising obtaining the first ultrasonic sensor signals from the first ultrasonically sensitive display surface for one or more time periods that are different from one or more time periods for which the second ultrasonic sensor signals are obtained.

Clause 30: The method of either clause 28 or clause 29, further comprising:
  obtaining first fingerprint data based, at least in part, on the first ultrasonic sensor signals, and
  obtaining second fingerprint data based, at least in part, on the second ultrasonic sensor signals.

Clause 31: The method of clause 30, further comprising performing an authentication process using the first fingerprint data and the second fingerprint data.

Clause 32: A non-transitory computer-readable medium storing computer-executable instructions which, when executed by one or more processors, cause the one or more processors to:
  cause an ultrasonic transmitter located within a housing of an apparatus to generate a non-planar ultrasonic wave responsive to receipt of one or more input signals, the apparatus having a) a display system with at least one display and a plurality of ultrasonically sensitive display surfaces, at least two of which are non-coplanar and each of which is associated with a different plurality of display pixels, and b) a plurality of ultrasonic sensor pixels, wherein each ultrasonic sensor pixel is associated with a different one of the ultrasonically sensitive display surfaces and the ultrasonic transmitter is not coextensive with the ultrasonically sensitive display surfaces; and cause ultrasonic sensor signals to be obtained from a subset of the ultrasonic sensor pixels associated with at least one of the ultrasonically sensitive display surfaces.

Clause 33: The non-transitory computer-readable medium of clause 32, wherein the non-planar ultrasonic wave is caused to pass through all of the ultrasonically sensitive display surfaces.

Clause 34: The non-transitory computer-readable medium of either of clauses 32 or 33, wherein:

the housing has a front side and a rear side facing in an opposite direction from the front side, and a first ultrasonically sensitive display surface of the ultrasonically sensitive display surfaces is on the front side of the housing and a second ultrasonically sensitive display surface of the ultrasonically sensitive display surfaces is on the rear side of the housing.

Clause 35: The non-transitory computer-readable medium of clause 34, wherein:

the housing has an edge side spanning between the front side and the rear side, and a third ultrasonically sensitive display surface of the ultrasonically sensitive display surfaces is on the edge side.

Clause 36: The non-transitory computer-readable medium of any one of clauses 32 through 35, wherein the ultrasonic transmitter is not in the form of a thin sheet.

Clause 37: The non-transitory computer-readable medium of any one of clauses 32 through 36, wherein the ultrasonic transmitter has a prismatic or cylindrical solid shape.

Clause 38: The non-transitory computer-readable medium of any one of clauses 32 through 37, wherein:

the ultrasonic transmitter has a shape that is substantially proportional to a shape of the housing, and the ultrasonic transmitter is substantially centered within the housing.

Clause 39: The non-transitory computer-readable medium of any one of clauses 32 through 38, wherein non-transitory computer-readable medium further stores additional computer-executable instructions which, when executed by one or more processors, cause the one or more processors to:

a) cause touch data to be obtained from a touch-sensing system of the apparatus indicating one or more touch events for a subset of one or more of the ultrasonically sensitive display surfaces, b) cause, responsive to (a), the ultrasonic transmitter to transmit the non-planar ultrasonic wave, and c) obtain, responsive to (a), ultrasonic sensor signals from the ultrasonic sensor pixels associated with at least one ultrasonically sensitive display surface in the subset of one or more ultrasonically sensitive display surfaces.

Clause 40: The non-transitory computer-readable medium of clause 39, wherein non-transitory computer-readable medium further store additional computer-executable instructions which, when executed by one or more processors, cause the one or more processors to obtain fingerprint data based, at least in part, on the ultrasonic sensor signals.

Clause 41: The non-transitory computer-readable medium of clause 40, wherein the fingerprint data is for between 1 and 10 fingers.

Clause 42: The non-transitory computer-readable medium of clause 40, wherein non-transitory computer-readable medium further store additional computer-executable instructions which, when executed by one or more processors, cause the one or more processors to perform an authentication process using the fingerprint data.

Clause 43: The non-transitory computer-readable medium of clause 39, wherein non-transitory computer-readable medium further store additional computer-executable instructions which, when executed by one or more processors, cause the one or more processors to:

d) detect when the touch data received from the touch-sensing system indicates that a first ultrasonically sensitive display surface and a second ultrasonically sensitive display surface of the plurality of ultrasonically sensitive display surfaces are both experiencing simultaneous touch events, and e) obtain, responsive to detecting that the touch data received from the touch-sensing system indicates that the first ultrasonically sensitive display surface and the second ultrasonically sensitive display surface of the plurality of ultrasonically sensitive display surfaces are both experiencing simultaneous touch events, first ultrasonic sensor signals from the first ultrasonically sensitive display surface and second ultrasonic sensor signals from the second ultrasonically sensitive display surface.

Clause 44: The non-transitory computer-readable medium of clause 43, wherein non-transitory computer-readable medium further store additional computer-executable instructions which, when executed by one or more processors, cause the one or more processors to obtain the first ultrasonic sensor signals from the first ultrasonically sensitive display surface for one or more time periods that are different from one or more time periods for which the second ultrasonic sensor signals are obtained.

Clause 45: The non-transitory computer-readable medium of either clause 43 or clause 44, wherein non-transitory computer-readable medium further store additional computer-executable instructions which, when executed by one or more processors, cause the one or more processors to:

obtain first fingerprint data based, at least in part, on the first ultrasonic sensor signals, and obtain second fingerprint data based, at least in part, on the second ultrasonic sensor signals.

Clause 46: The non-transitory computer-readable medium of clause 45, wherein non-transitory computer-readable medium further store additional computer-executable instructions which, when executed by one or more processors, cause the one or more processors to perform an authentication process using the first fingerprint data and the second fingerprint data.

Clause 47: An apparatus comprising:

means for ultrasonically sensing fingerprints from a plurality of non-coplanar surfaces;

means for displaying graphical content on the plurality of non-coplanar surfaces; and ultrasonic transmission means that is not coextensive with the means for ultrasonically sensing fingerprints, the ultrasonic transmission means configured to generate and transmit one or more ultrasonic waves responsive to receipt of one or more input signals.

Clause 48: The apparatus of clause 47, wherein the ultrasonic transmission means is configured to emit one or more ultrasonic waves that pass through all of the surfaces on which graphical content can be displayed.

Clause 49: The apparatus of either clause 47 or clause 48, wherein the ultrasonic transmission means is the only ultrasonic transmission means in the apparatus configured to be used to provide ultrasonic waves for detection by the means for ultrasonically sensing fingerprints from the plurality of non-coplanar surfaces.

Clause 50: The apparatus of any one of clauses 47 through 49, further comprising housing means, wherein:
the housing means has a front side and a rear side facing in an opposite direction from the front side, and
the plurality of non-coplanar surfaces includes the front side of the housing means and the rear side of the housing means.

Clause 51: The apparatus of clause 50, wherein:
the housing means has an edge side spanning between the front side and the rear side, and
the plurality of non-coplanar surfaces further includes the edge side.

Clause 52: The apparatus of any one of clauses 47 through 51, wherein the ultrasonic transmission means is not in the form of a thin sheet.

Clause 53: The apparatus of any one of clauses 47 through 52, wherein the ultrasonic transmission means has a prismatic or cylindrical solid shape.

Clause 54: The apparatus of either of clauses 50 or 51, wherein:
the ultrasonic transmission means has a shape that is substantially proportional to a shape of the housing means, and
the ultrasonic transmission means is substantially centered within the housing means.

Clause 55: The apparatus of any one of clauses 47 through 54, further comprising:
touch-sensing means for detecting when one or more of the plurality of non-coplanar surfaces experience a touch event, and
control means for:
a) receiving touch data from the touch-sensing means indicating one or more touch events for a subset of one or more of the non-coplanar surfaces,
b) causing, responsive to (a), the ultrasonic transmission means to transmit one or more ultrasonic waves, and
c) obtaining, responsive to (a), ultrasonic sensor signals from the means for ultrasonically sensing fingerprints associated with at least one surface in the plurality of non-coplanar surfaces.

Clause 56: The apparatus of clause 55, wherein the control means is for obtaining fingerprint data based, at least in part, on the ultrasonic sensor signals.

Clause 57: The apparatus of clause 56, wherein the fingerprint data is for between 1 and 10 fingers.

Clause 58: The apparatus of clause 56, wherein the control means is further for performing an authentication process using the fingerprint data.

Clause 59: The apparatus of clause 55, wherein the control means is further for:
d) detecting when the touch data received from the touch-sensing means indicates that a first surface and a second surface of the plurality of non-coplanar surfaces are both experiencing simultaneous touch events, and
e) obtaining, responsive to detecting that the touch data received from the touch-sensing means indicates that the first surface and the second surface of the plurality of non-coplanar surfaces are both experiencing simultaneous touch events, first ultrasonic sensor signals from the first surface and second ultrasonic sensor signals from the second surface via the means for ultrasonically sensing fingerprints.

Clause 60: The apparatus of clause 59, wherein the control means is further for obtaining the first ultrasonic sensor signals from the first surface for one or more time periods that are different from one or more time periods for which the second ultrasonic sensor signals are obtained.

Clause 61: The apparatus of either clause 59 or clause 60, wherein the control means is further for:
obtaining first fingerprint data based, at least in part, on the first ultrasonic sensor signals, and
obtaining second fingerprint data based, at least in part, on the second ultrasonic sensor signals.

Clause 62: The apparatus of clause 61, wherein the control means is further for performing an authentication process using the first fingerprint data and the second fingerprint data.

What is claimed is:

1. An apparatus comprising:
an ultrasonic fingerprint sensor system including a plurality of ultrasonic sensor pixels disposed within one or more layer stacks, each layer stack having at least a corresponding piezoelectric layer and a corresponding electrode layer and each ultrasonic sensor pixel configured to generate a corresponding ultrasonic sensor signal responsive to that ultrasonic sensor pixel detecting passage of an ultrasonic wave therethrough;
a display system including at least one display, the display system including a plurality of ultrasonically sensitive display surfaces, each ultrasonically sensitive display surface associated with a different subset of display pixels of the display system and a different subset of the ultrasonic sensor pixels, wherein at least two of the ultrasonically sensitive display surfaces are not coplanar with each other; and
an ultrasonic transmitter that is not coextensive with the ultrasonically sensitive display surfaces and not part of any of the one or more layer stacks, the ultrasonic transmitter configured to transmit one or more ultrasonic waves responsive to receipt of one or more input signals, wherein the apparatus is defined by a plurality of rigid outermost surfaces that include the ultrasonically sensitive display surfaces.

2. The apparatus of claim 1, wherein the ultrasonic transmitter is configured to emit one or more ultrasonic waves that pass through all of the ultrasonically sensitive display surfaces.

3. The apparatus of claim 1, wherein the ultrasonic transmitter is the only ultrasonic transmitter in the apparatus configured to be used to provide ultrasonic waves for detection by the ultrasonically sensitive display surfaces.

4. The apparatus of claim 1, further comprising a housing, wherein:
the housing has a front side and a rear side facing in an opposite direction from the front side, and
a first ultrasonically sensitive display surface of the ultrasonically sensitive display surfaces is on the front side of the housing and a second ultrasonically sensitive display surface of the ultrasonically sensitive display surfaces is on the rear side of the housing.

5. The apparatus of claim 4, wherein:
the housing has an edge side spanning between the front side and the rear side, and
a third ultrasonically sensitive display surface of the ultrasonically sensitive display surfaces is on the edge side.

6. The apparatus of claim 1, wherein the ultrasonic transmitter is not in the form of a thin sheet.

7. The apparatus of claim 6, wherein the ultrasonic transmitter has a prismatic or cylindrical solid shape.

8. The apparatus of claim 4, wherein:
the ultrasonic transmitter has a shape that is substantially proportional to a shape of the housing, and
the ultrasonic transmitter is substantially centered within the housing.

9. The apparatus of claim 4, further comprising:
a touch-sensing system configured to independently detect when one or more of the ultrasonically sensitive display surfaces experiences a touch event, and
a controller configured to:
  a) receive touch data from the touch-sensing system indicating one or more touch events for a subset of one or more of the ultrasonically sensitive display surfaces,
  b) cause, responsive to (a), the ultrasonic transmitter to transmit one or more ultrasonic waves, and
  c) obtain, responsive to (a), ultrasonic sensor signals from the ultrasonic sensor pixels associated with at least one ultrasonically sensitive display surface in the subset of one or more ultrasonically sensitive display surfaces.

10. The apparatus of claim 9, wherein the controller is further configured to obtain fingerprint data based, at least in part, on the ultrasonic sensor signals.

11. The apparatus of claim 10, wherein the fingerprint data is for between 1 and 10 fingers.

12. The apparatus of claim 10, wherein the controller is further configured to perform an authentication process using the fingerprint data.

13. The apparatus of claim 9, wherein the controller is further configured to:
  d) detect when the touch data received from the touch-sensing system indicates that a first ultrasonically sensitive display surface and a second ultrasonically sensitive display surface of the plurality of ultrasonically sensitive display surfaces are both experiencing simultaneous touch events, and
  e) obtain, responsive to detecting that the touch data received from the touch-sensing system indicates that the first ultrasonically sensitive display surface and the second ultrasonically sensitive display surface of the plurality of ultrasonically sensitive display surfaces are both experiencing simultaneous touch events, first ultrasonic sensor signals from the first ultrasonically sensitive display surface and second ultrasonic sensor signals from the second ultrasonically sensitive display surface.

14. The apparatus of claim 13, wherein the controller is further configured to obtain the first ultrasonic sensor signals from the first ultrasonically sensitive display surface for one or more time periods that are different from one or more time periods for which the second ultrasonic sensor signals are obtained.

15. The apparatus of claim 13, wherein the controller is further configured to:
obtain first fingerprint data based, at least in part, on the first ultrasonic sensor signals, and
obtain second fingerprint data based, at least in part, on the second ultrasonic sensor signals.

16. The apparatus of claim 15, wherein the controller is further configured to perform an authentication process using the first fingerprint data and the second fingerprint data.

17. A method comprising:
generating an omnidirectional ultrasonic wave responsive to receipt of one or more input signals and using an ultrasonic transmitter located within a housing of an apparatus having a) a display system with at least one display and a plurality of ultrasonically sensitive display surfaces, at least two of which are non-coplanar and each of which is associated with a different plurality of display pixels, and b) a plurality of ultrasonic sensor pixels, wherein each ultrasonic sensor pixel is associated with a different one of the ultrasonically sensitive display surfaces and the ultrasonic transmitter is not coextensive with the ultrasonically sensitive display surfaces; and
obtaining ultrasonic sensor signals from a subset of the ultrasonic sensor pixels associated with at least one of the ultrasonically sensitive display surfaces.

18. The method of claim 17, further comprising causing the omnidirectional ultrasonic wave to pass through all of the ultrasonically sensitive display surfaces.

19. A non-transitory computer-readable medium storing computer-executable instructions which, when executed by one or more processors, cause the one or more processors to:
cause an ultrasonic transmitter located within a housing of an apparatus to generate an omnidirectional ultrasonic wave responsive to receipt of one or more input signals, the apparatus having a) a display system with at least one display and a plurality of ultrasonically sensitive display surfaces, at least two of which are non-coplanar and each of which is associated with a different plurality of display pixels, and b) a plurality of ultrasonic sensor pixels, wherein each ultrasonic sensor pixel is associated with a different one of the ultrasonically sensitive display surfaces and the ultrasonic transmitter is not coextensive with the ultrasonically sensitive display surfaces; and
cause ultrasonic sensor signals to be obtained from a subset of the ultrasonic sensor pixels associated with at least one of the ultrasonically sensitive display surfaces.

20. The non-transitory computer-readable medium of claim 19, wherein the omnidirectional ultrasonic wave is caused to pass through all of the ultrasonically sensitive display surfaces.

* * * * *